(12) United States Patent
Chu et al.

(10) Patent No.: US 9,912,388 B2
(45) Date of Patent: Mar. 6, 2018

(54) SUB-CHANNEL ALLOCATION IN ORTHOGONAL FREQUENCY DIVISION MULTIPLEX WLAN

(71) Applicant: Marvell World Trade Ltd., St. Michael (BB)

(72) Inventors: Liwen Chu, San Ramon, CA (US); Lei Wang, San Diego, CA (US); Hongyuan Zhang, Fremont, CA (US); Hui-Ling Lou, Sunnyvale, CA (US); Yakun Sun, Sunnyvale, CA (US); Jinjing Jiang, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 103 days.

(21) Appl. No.: 14/738,521

(22) Filed: Jun. 12, 2015

(65) Prior Publication Data

US 2015/0365940 A1 Dec. 17, 2015

Related U.S. Application Data

(60) Provisional application No. 62/011,332, filed on Jun. 12, 2014, provisional application No. 62/044,838, (Continued)

(51) Int. Cl.
*H04B 7/04* (2017.01)
*H04B 7/0413* (2017.01)
(Continued)

(52) U.S. Cl.
CPC ......... *H04B 7/0413* (2013.01); *H04B 7/0452* (2013.01); *H04L 5/0007* (2013.01); (Continued)

(58) Field of Classification Search
None
See application file for complete search history.

(56) References Cited

U.S. PATENT DOCUMENTS 6,937,665 B1 * 8/2005 Vandenameele ....... H04B 1/707
370/210
8,155,138 B2 4/2012 van Nee
(Continued)

FOREIGN PATENT DOCUMENTS

WO WO-2015/070230 5/2015

OTHER PUBLICATIONS

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).
(Continued)

*Primary Examiner* — Hicham Foud

(57) ABSTRACT

A method for simultaneous communication with multiple communication devices in a wireless local area network is described. Respective sub-channels of an orthogonal frequency division multiplexing (OFDM) communication channel are allocated to two or more second communication devices for simultaneous OFDM transmission to the two or more second communication devices, including allocating first and second sub-channels to first and second ones of the two or more second communication devices, respectively. Respective downlink OFDM data units are generated using the corresponding allocated sub-channels. The downlink OFDM data units are transmitted using the corresponding allocated sub-channels. At least first and second uplink OFDM data units transmitted by the respective second communication device in response to the corresponding downlink OFDM data unit are received. The first and second uplink OFDM data units are transmitted from the respective second communication device via the corresponding allocated sub-channel.

33 Claims, 21 Drawing Sheets

Related U.S. Application Data filed on Sep. 2, 2014, provisional application No. 62/112,959, filed on Feb. 6, 2015.

(51) Int. Cl.

| | |
|---|---|
| *H04L 5/00* | (2006.01) |
| *H04B 7/0452* | (2017.01) |
| *H04W 72/04* | (2009.01) |
| *H04W 74/02* | (2009.01) |
| *H04L 27/26* | (2006.01) |
| *H04W 84/12* | (2009.01) |

(52) U.S. Cl.
CPC .......... *H04L 5/0023* (2013.01); *H04L 5/0037* (2013.01); *H04L 5/0094* (2013.01); *H04L 27/2656* (2013.01); *H04W 72/0446* (2013.01); *H04W 72/0453* (2013.01); *H04W 74/02* (2013.01); *H04L 5/0053* (2013.01); *H04L 5/0055* (2013.01); *H04W 84/12* (2013.01)

(56) References Cited

U.S. PATENT DOCUMENTS

| | | | |
|---|---|---|---|
| 8,526,351 B2 | 9/2013 | Fischer et al. | |
| 8,724,720 B2 | 5/2014 | Srinivasa et al. | |
| 2006/0221879 A1* | 10/2006 | Nakajima | H04W 74/0808 370/310 |
| 2009/0196163 A1 | 8/2009 | Du | |
| 2011/0002219 A1 | 1/2011 | Kim et al. | |
| 2011/0110349 A1* | 5/2011 | Grandhi | H04W 28/18 370/338 |
| 2011/0261708 A1 | 10/2011 | Grandhi | |
| 2012/0213204 A1* | 8/2012 | Noh | H04W 72/02 370/331 |
| 2012/0327915 A1* | 12/2012 | Kang | H04L 5/0007 370/336 |
| 2013/0176939 A1* | 7/2013 | Trainin | H04L 1/1614 370/328 |
| 2013/0229996 A1 | 9/2013 | Wang et al. | |
| 2014/0328313 A1* | 11/2014 | Merlin | H04B 7/2621 370/330 |
| 2015/0131517 A1 | 5/2015 | Chu et al. | |

OTHER PUBLICATIONS

Stacey et al., "Specification Framework for TGac," document No. IEEE 802.11-09/0992r20, *Institute for Electrical and Electronics Engineers*, pp. 1-49, (Jan. 18, 2011).

IEEE Std 802.11ac/D2.0 "Draft Standard for Information Technology—Telecommunications and information exchange between systems—Local and metropolitan area networks—Specific requirements, Part 11 : Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers Inc.*, pp. 1-359 (Jan. 2012).

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).

IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).

IEEE Std 802.11ac/D4.0 "Draft Standard for Information Technology—Telecommunications and information exchange between systems13 Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).

IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).

EE Std 802.11 ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).

U.S. Appl. No. 15/337,579, Chu et al., "Sub-Channel Allocation in Orthogonal Frequency Division Multiplex WLAN," filed Oct. 28, 2016.

International Preliminary Report on Patentability in International Patent Application No. PCT/US2015/035649, dated Dec. 22, 2016 (9 pages).

International Search Report and Written Opinion in International Application No. PCT/US2015/035649, dated Aug. 19, 2015 (13 pages).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

Van Nee et al. "The 802.11n MIMO-OFDM Standard for Wireless LAN and Beyond," Wireless Personal Communications, vol. 37, pp. 445-453 (Jun. 2006).

Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).

Communication Pursuant to Article 94(3) EPC in European Patent Application No. 15 731 795.9-1875, dated Nov. 28, 2017 (7 pages).

\* cited by examiner

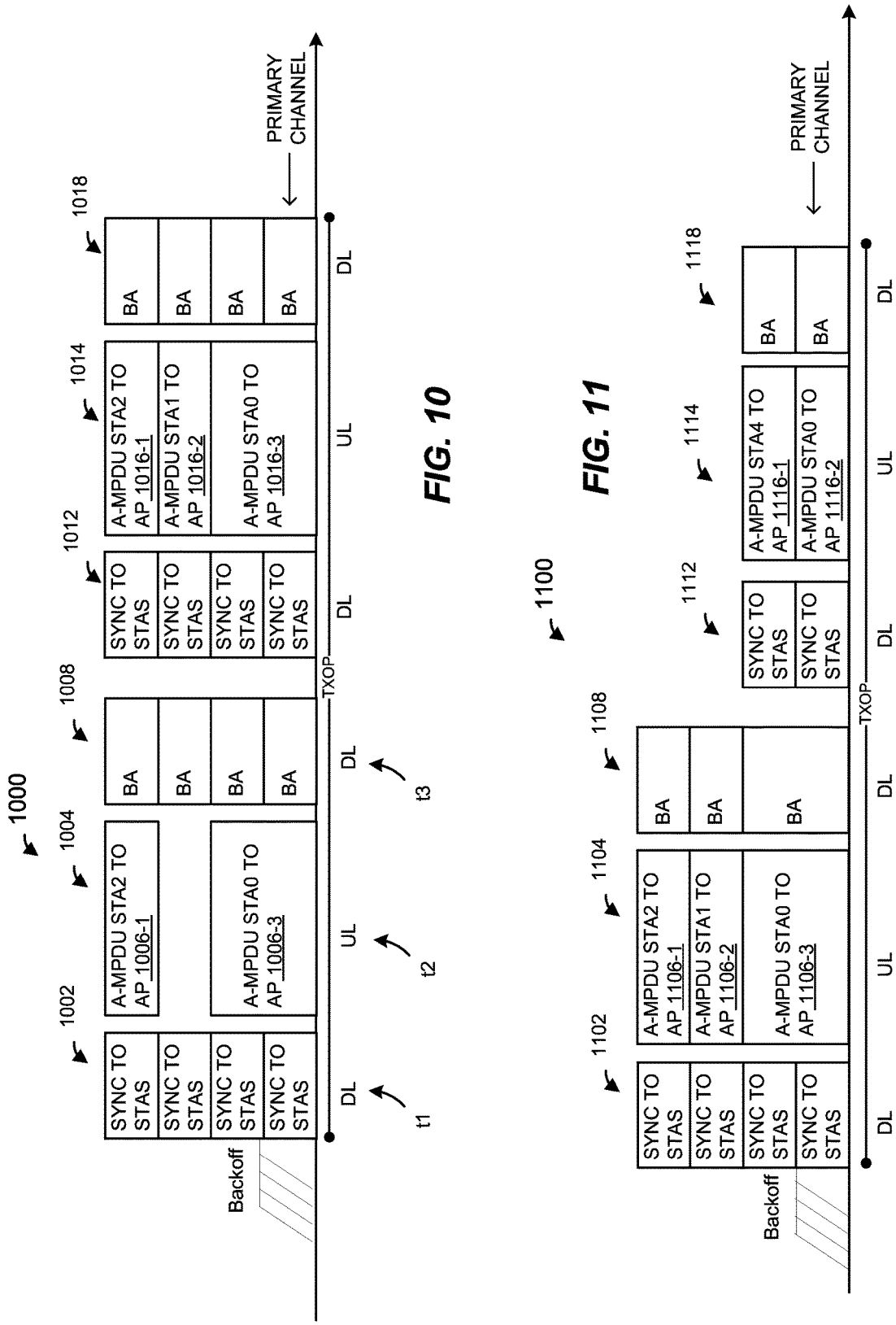

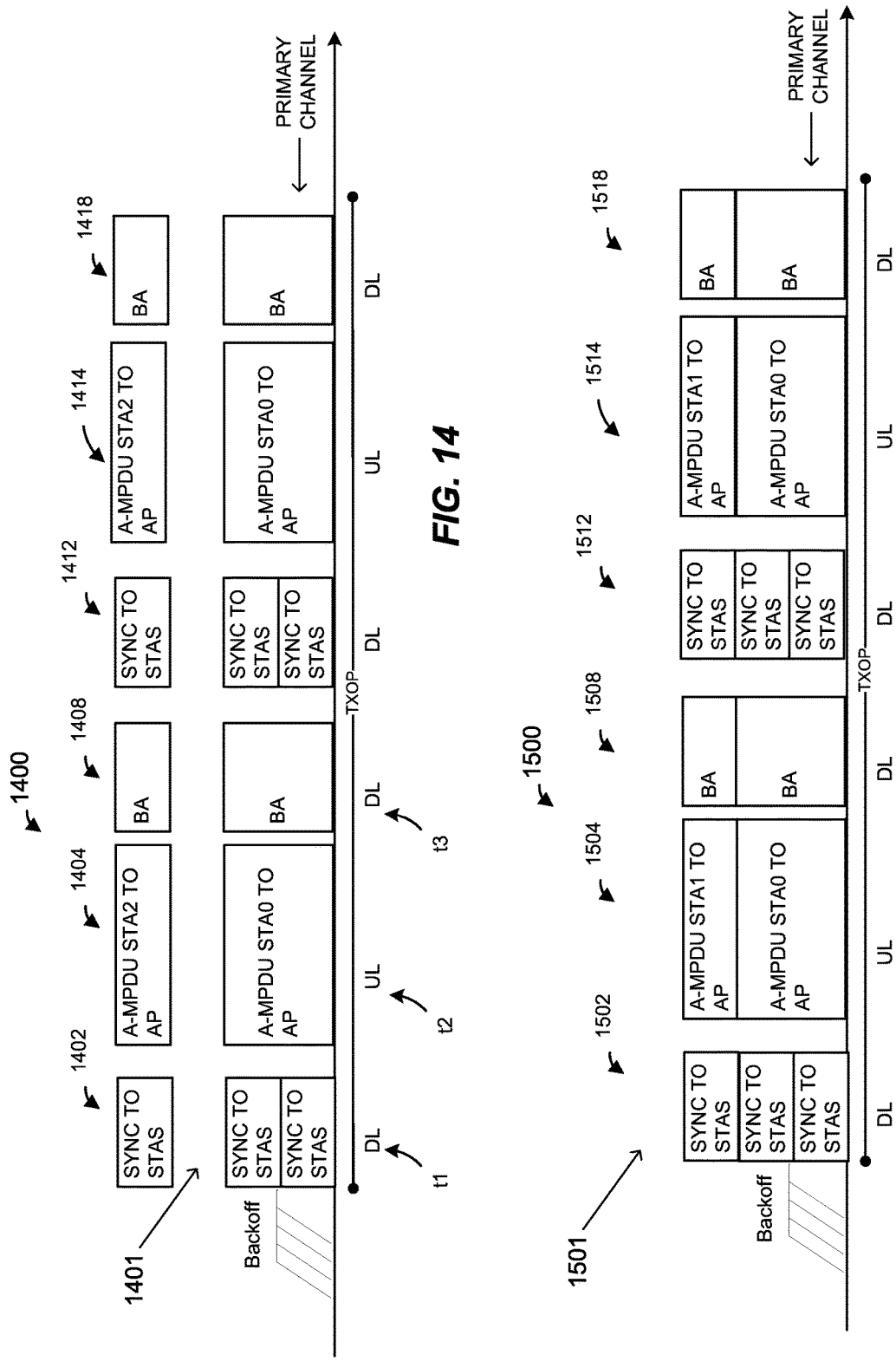

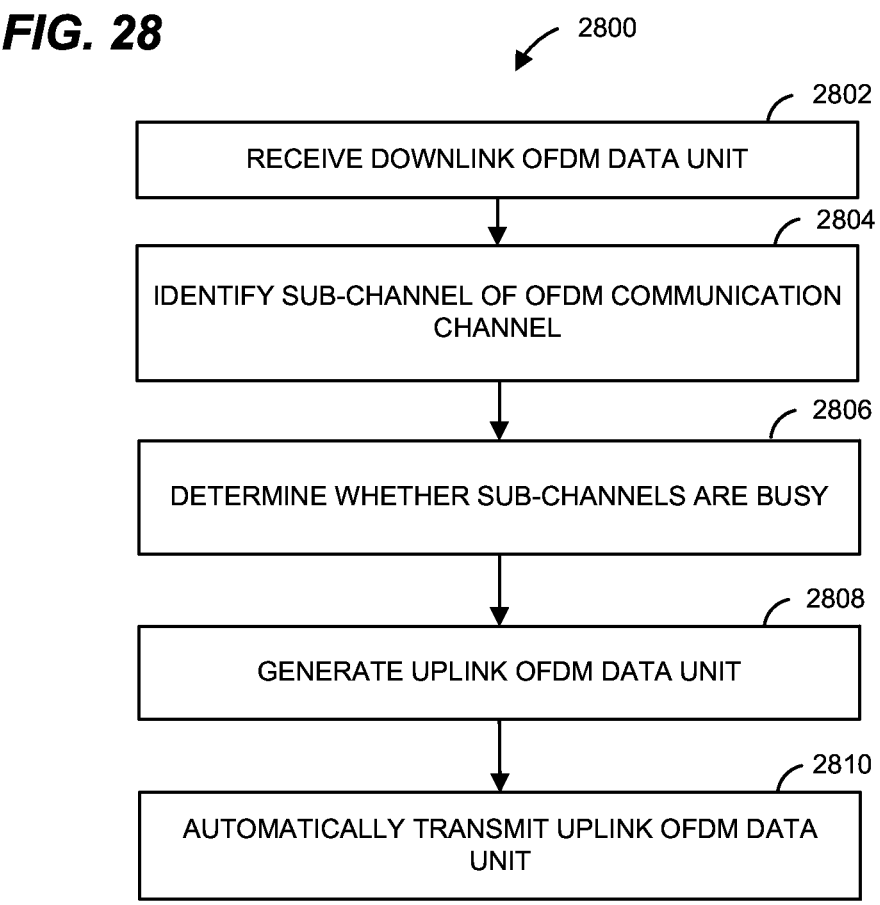

SUB-CHANNEL ALLOCATION IN ORTHOGONAL FREQUENCY DIVISION MULTIPLEX WLAN

CROSS-REFERENCE TO RELATED APPLICATION

This disclosure claims the benefit of U.S. Provisional Patent Application No. 62/011,332, entitled "Bandwidth/AC Selection and Acknowledge Indication in OFDMA, UL MU MIMO" and filed on Jun. 12, 2014, U.S. Provisional Patent Application No. 62/044,838, entitled "Bandwidth/AC Selection and Acknowledge Indication in OFDMA, UL MU MIMO" and filed on Sep. 2, 2014, and U.S. Provisional Patent Application No. 62/112,959, entitled "Bandwidth Selection and Acknowledge Indication in OFDMA, UL MU MIMO" and filed on Feb. 6, 2015, the disclosures of each of which are incorporated herein by reference in their entireties.

FIELD OF THE DISCLOSURE

The present disclosure relates generally to communication networks and, more particularly, to wireless local area networks that utilize orthogonal frequency division multiplexing (OFDM).

BACKGROUND

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

These WLANs operate in either a unicast mode or a multicast mode. In the unicast mode, the AP transmits information to one client station at a time. In the multicast mode, the same information is transmitted to a group of client stations concurrently.

SUMMARY

In an embodiment, a method for simultaneous communication with multiple communication devices in a wireless local area network includes allocating, by a first communication device, respective sub-channels of an orthogonal frequency division multiplexing (OFDM) communication channel to two or more second communication devices for simultaneous OFDM transmission to the two or more second communication devices, including allocating a first sub-channel to a first one of the two or more second communication devices and a second sub-channel to a second one of the two or more second communication devices. The method also includes generating, by the first communication device, respective downlink OFDM data units for the two or more second communication devices using the corresponding allocated sub-channels. The method includes transmitting, by the first communication device, the downlink OFDM data units to the two or more second communication devices using the corresponding allocated sub-channels. The method also includes receiving, at the first communication device, at least i) a first uplink OFDM data unit transmitted by the first one of the two or more second communication devices in response to the corresponding downlink OFDM data unit and ii) a second uplink OFDM data unit transmitted by the second one of the two or more second communication devices in response to the corresponding downlink OFDM data unit, wherein the first uplink OFDM data unit is transmitted from the first one of the two or more second communication devices via the first sub-channel allocated to the first one of the two or more second communication devices and the second uplink OFDM data unit is transmitted from the second one of the two or more second communication devices via the second sub-channel allocated to the second one of the two or more second communication devices.

In another embodiment, a method for simultaneous communication with multiple communication devices in a wireless local area network includes receiving, at a first communication device from a second communication device, a downlink orthogonal frequency division multiplexing (OFDM) data unit via an OFDM communication channel. The method also includes identifying, by the first communication device, a sub-channel of the OFDM communication channel on which the downlink OFDM data unit was transmitted by the second communication device. The method includes generating, by the first communication device in response to the downlink OFDM data unit, an uplink OFDM data unit to be transmitted via the sub-channel on which the downlink OFDM data unit was transmitted. The method also includes automatically transmitting the uplink OFDM data unit to the second communication device via the sub-channel on which the downlink OFDM data unit was transmitted.

In an embodiment, a method for simultaneous communication with multiple communication devices in a wireless local area network includes receiving, at a first communication device, one or more downlink orthogonal frequency division multiplexing (OFDM) data units transmitted by a second communication device via one or more respective sub-channels of an OFDM communication channel. The method includes identifying, by the first communication device, the one or more sub-channels of the OFDM communication channel on which the one or more downlink OFDMA data units were transmitted. The method also includes determining, by the first communication device, whether each of the one or more sub-channels on which the one or more downlink OFDMA data units were transmitted is busy. The method includes generating, by the first communication device, an uplink OFDM data unit for each sub-channel determined to be not busy. The method also includes transmitting each of the uplink OFDM data units to the second communication device via the corresponding sub-channel.

BRIEF DESCRIPTION OF THE DRAWINGS

FIG. 10 is a frame exchange between an AP and a plurality of client stations that includes uplink OFDMA transmission of data from the plurality client stations to the AP, according to another embodiment.

FIG. 11 is a frame exchange between an AP and a plurality of client stations that includes uplink OFDMA transmission of data from the plurality client stations to the AP, according to another embodiment.

FIG. 14 is a frame exchange between an AP and a plurality of client stations that includes uplink OFDMA transmission of data from the plurality client stations the AP, according to an embodiment.

FIG. 15 is a frame exchange between an AP and a plurality of client stations that includes uplink OFDMA transmission of data from the plurality client stations the AP, according to an embodiment.

FIG. 28 is a flow diagram of an example method for simultaneous communication with multiple communication devices in a wireless local area network, according to an embodiment.

DETAILED DESCRIPTION

In embodiments described below, a wireless network device such as an access point (AP) of a wireless local area network (WLAN) simultaneously transmits independent data streams to multiple client stations and/or receives independent data streams simultaneously transmitted by multiple client stations. In particular, the AP transmits data for the multiple clients in different sub-channels of an orthogonal frequency division multiplexing (OFDM) communication channel, in various embodiments. In an embodiment, the sub-channels indicate bandwidth in an orthogonal frequency division multiple access (OFDMA) transmission, in an embodiment. In another embodiment, the sub-channels are space time streams of a multiuser multiple input, multiple output (MU-MIMO) communication channel. Similarly, multiple client stations simultaneously transmit data to the AP, in particular, each client station transmits data in a different OFDM sub-channel, in various embodiments.

The AP is configured to operate with client stations according to at least a first communication protocol. The first communication protocol is sometimes referred to herein as "high efficiency WiFi," "high efficiency WLAN," "HEW" communication protocol, or 802.11ax communication protocol. In an embodiment, the first communication protocol supports OFDMA communication between the AP and the client stations. In an embodiment, the first communication protocol supports MU-MIMO communication between the AP and the client stations. In some embodiments, different client stations in the vicinity of the AP are configured to operate according to one or more other communication protocols that define operation in the same frequency band as the HEW communication protocol but with generally lower data throughputs. The lower data throughput communication protocols (e.g., IEEE 802.11a, IEEE 802.11n, and/or IEEE 802.11ac) are collectively referred herein as "legacy" communication protocols. The legacy communication protocols do not support OFDMA communication, in an embodiment. In another embodiment, the legacy communication protocols do not support MU-MIMO communication.

In an embodiment, client stations that are configured to operate according to the HEW communication protocol generally support OFDMA communication and/or MU-MIMO communication initiated by the AP. In some embodiments, client stations that are configured to operate according to the HEW communication protocol optionally support OFDMA communication and/or MU-MIMO communication initiated by the client stations.

Figure 1:
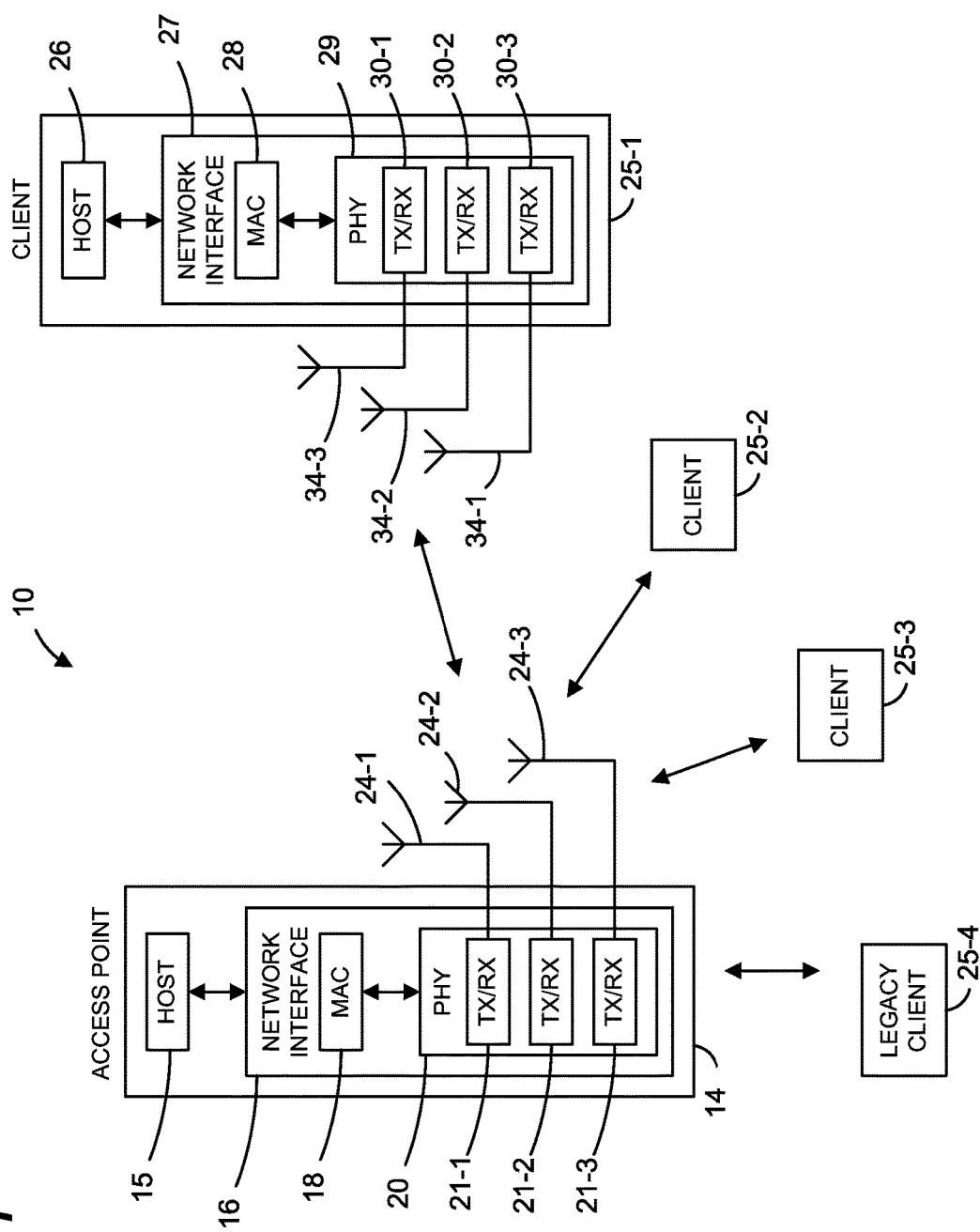
FIG. 1 is a block diagram of an example wireless local area network (WLAN), according to an embodiment.

FIG. 1 is a block diagram of an example wireless local area network (WLAN) 10, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 includes different numbers (e.g., 1, 2, 4, 5, etc.) of transceivers 21 and antennas 24 in other embodiments.

The WLAN 10 includes a plurality of client stations 25. Although four client stations 25 are illustrated in FIG. 1, the WLAN 10 includes different numbers (e.g., 1, 2, 3, 5, 6, etc.) of client stations 25 in various scenarios and embodiments. Two or more of the client stations 25 are configured to receive corresponding data streams that are transmitted simultaneously by the AP 14. Additionally, two or more of the client stations 25 are configured to transmit corresponding data streams to the AP 14 such that the AP 14 simultaneously receives the data streams.

A client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes different numbers (e.g., 1, 2, 4, 5, etc.) of transceivers 30 and antennas 34 in other embodiments.

In an embodiment, one or more of the client stations 25-2, 25-3, and 25-4 has a structure the same as or similar to the client station 25-1. In these embodiments, the client stations 25 structured like the client station 25-1 have the same or a different number of transceivers and antennas. For example, the client station 25-2 has only two transceivers and two antennas (not shown), according to an embodiment.

According to an embodiment, the client station 25-4 is a legacy client station that is not enabled to receive a data stream that is simultaneously transmitted by the AP 14 with other independent data streams as part of an OFDMA transmission or as part of a MU-MIMO transmission to multiple client stations 25. Similarly, according to an embodiment, the legacy client station 25-4 is not enabled to transmit a data stream that to the AP 14 as part of OFDMA transmission or as part of a MU-MIMO transmission from multiple client stations 25. According to an embodiment, the legacy client station 25-4 includes a PHY processing unit that is generally capable of receiving a data stream that is simultaneously transmitted by the AP 14 with other independent data streams that are intended for other client stations 25. But the legacy client station 25-4 includes a MAC processing unit that is not enabled with MAC layer functions that support receiving the data stream that is simultaneously transmitted by the AP 14 with other independent data streams that are intended for other client stations 25. According to an embodiment, the legacy client station 25-4 includes a PHY processing unit that is generally capable of transmitting a data stream to the AP 14 at the same time that other client stations 25 transmit data to the AP 14. But the legacy client station 25-4 includes a MAC processing unit that is not enabled with MAC layer functions that support transmitting a data stream to the AP 14 at the same time that other client stations 25 transmit data to the AP 14.

In an embodiment, the AP 14 and the client stations 25 contend for communication medium using carrier sense multiple access with collision avoidance (CSMA/CA) protocol or another suitable medium access protocol. Further, in an embodiment, the AP 14 or a client station 25 dynamically selects a bandwidth for a transmission based on channels available for the transmission. In an embodiment, communication between the AP 14 and a legacy client station (e.g., the legacy client station 25-4) occur in a primary channel of the WLAN 10, or in a wider channel that includes the primary channel of the WLAN 10. For example, the legacy communication protocol requires that each transmission includes the primary channel, in an embodiment. On the other hand, communication between the AP 14 and a non-legacy client station 25 (e.g., the client station 25-1) can occur in one or more communication channels that do not include the primary channel, in an embodiment. For example, the non-legacy communication protocol, such as the HEW communication protocol, allows communication between the AP and the client stations to occur in a communication channel that does not include the primary channel, in an embodiment.

In an embodiment, the AP 14 is configured to simultaneously transmit different OFDM units to different client stations 25 by forming an OFDMA data unit that includes the different OFDM data units modulated in respective sub-channel blocks of the OFDMA data unit. In an embodiment, the AP 14 allocates different sub-channels to different client stations and forms the OFDMA data unit that includes OFDM data units directed to by modulating the different client stations in sub-channel blocks corresponding to the sub-channels assigned to the client stations. In an embodiment, when the one or more client stations include a legacy client station, the AP assigns a channel that includes a primary channel of the WLAN 10 to the legacy client station, and assigns one or more non-primary communication channels of the WLAN 10 to one or more non-legacy client stations. When the one or more client stations do not include any legacy client stations, the AP assigns the primary and the non-primary communication channels in any suitable manner to the one or more client stations, in various embodiments.

In an embodiment, the AP 14 is configured to simultaneously transmit different OFDM units to different client stations 25 by transmitting the different OFDM data units via different space time streams of a MU-MIMO communication channel. In an embodiment, the AP 14 allocates different sub-channels (i.e., space time streams) to different client stations and forms the OFDM data units and modulates the different OFDM data units to the space time streams corresponding to the sub-channels assigned to the client stations. In an embodiment, when the one or more client stations include a legacy client station, the AP assigns a channel that includes a primary channel of the WLAN 10 to the legacy client station, and assigns one or more non-primary communication channels of the WLAN 10 to one or more non-legacy client stations. When the one or more client stations do not include any legacy client stations, the AP assigns the primary and the non-primary communication channels in any suitable manner to the one or more client stations, in various embodiments.

Figures 2A, 2B, 2C:
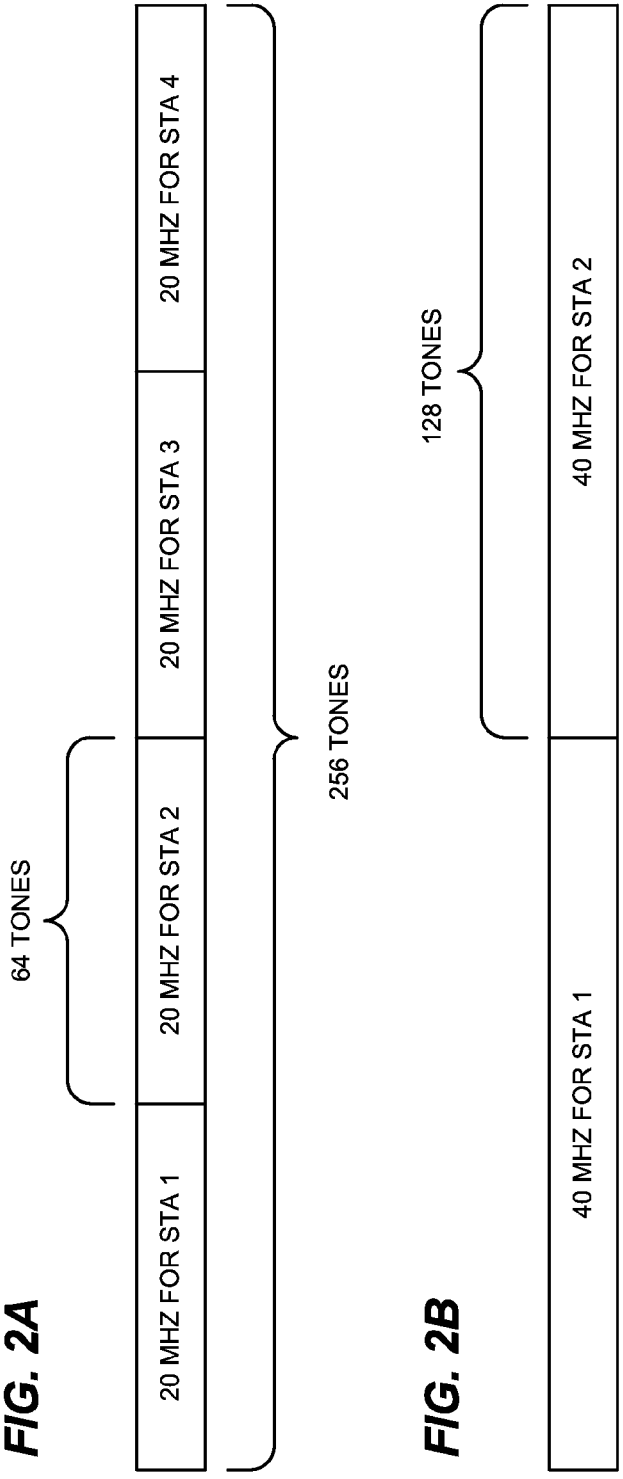
FIGS. 2A, 2B, and 2C are diagrams illustrating example orthogonal frequency division multiplexing (OFDM) sub-channel blocks for an 80 MHz communication channel, according to an embodiment.

FIGS. 2A, 2B, and 2C are diagrams illustrating example OFDM sub-channel blocks for an 80 MHz communication channel, according to an embodiment. In FIG. 2A, the communication channel is partitioned into four contiguous OFDM sub-channel blocks, each having a bandwidth of 20 MHz. The OFDM sub-channel blocks include independent data streams for four client stations. In FIG. 2B, the communication channel is partitioned into two contiguous OFDM sub-channel blocks, each having a bandwidth of 40 MHz. The OFDM sub-channel blocks include independent data streams for two client stations. In FIG. 2C, the communication channel is partitioned into three contiguous OFDM sub-channel blocks. Two OFDM sub-channel blocks each have a bandwidth of 20 MHz. The remaining OFDM sub-channel block has a bandwidth of 40 MHz. The OFDM sub-channel blocks include independent data streams for three client stations. In some embodiments, a sub-channel has a bandwidth that is less than 20 MHz, for example, 10 MHz, 2 MHz, or another suitable bandwidth.

Although in FIGS. 2A, 2B, and 2C, the OFDM sub-channel blocks are contiguous across the communication channel, in other embodiments the OFDM sub-channel blocks are not contiguous across the communication channel (i.e., there are one or more gaps between the OFDM sub-channel blocks). In an embodiment, each gap is at least as wide as one of the OFDM sub-channel blocks. In another embodiment, at least one gap is less than the bandwidth of an OFDM sub-channel block. In another embodiment, at least one gap is at least as wide as 1 MHz. In an embodiment, different OFDM sub-channel blocks are transmitted in different channels defined by the IEEE 802.11a and/or 802.11n Standards. In one embodiment, the AP includes a plurality of radios and different OFDM sub-channel blocks are transmitted using different radios.

Figure 3:
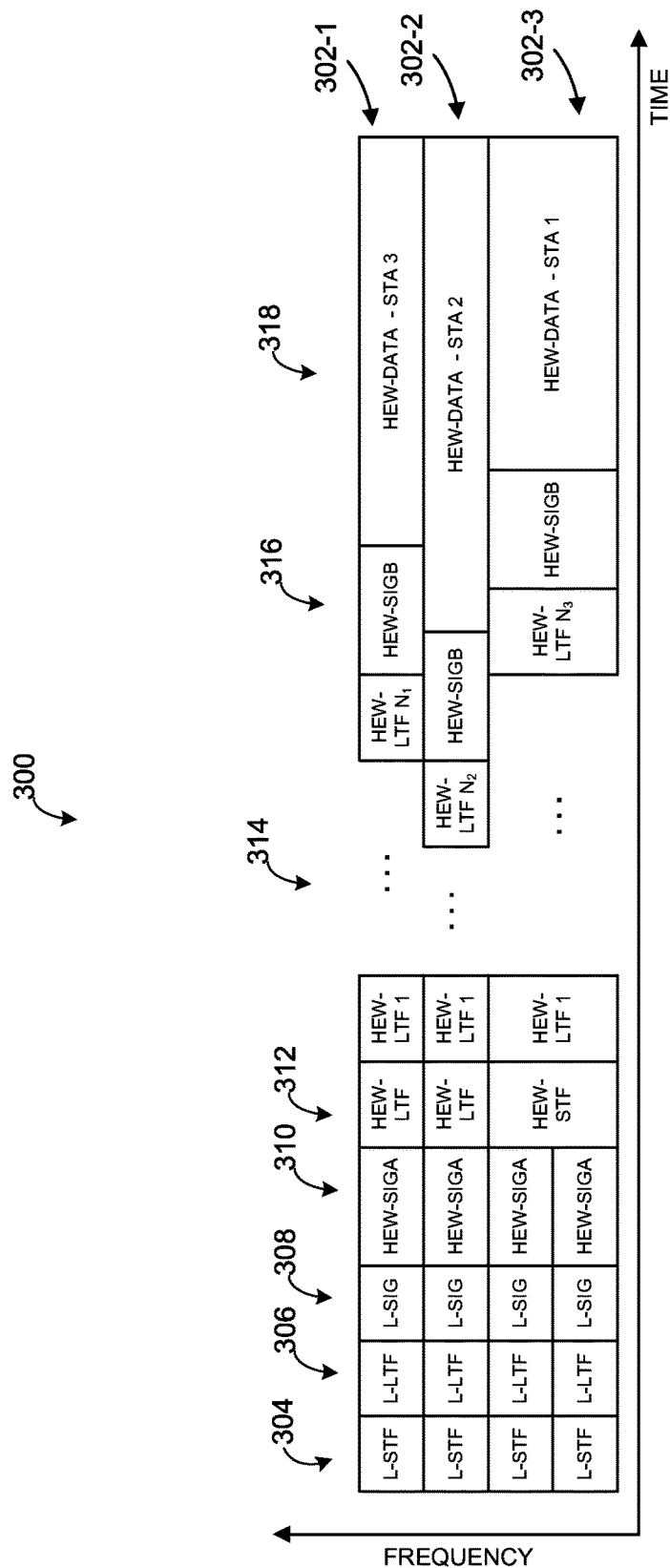
FIG. 3 is a diagram of an example orthogonal frequency division multiple access (OFDMA) data unit, according to an embodiment.

FIG. 3 is a diagram of an example OFDMA data unit 300, according to an embodiment. The OFDMA data unit 300 includes a plurality of OFDM data unit 302-1, 302-2 and 302-3. In an embodiment, the AP 14 transmits the OFDM data units 302-1, 302-2, 302-3 to different client stations 25 via respective OFDM sub-channels within the OFDMA data unit 300. In another embodiment, different client stations 25 transmit respective OFDM data units 302-1, 302-2, 302-3 to the AP 14 in respective OFDM sub-channels within the OFDMA data unit 300. In this embodiment, The AP 14 receives the OFDM data units 302-1, 302-2, 302-3 from the client stations 25 via respective OFDM sub-channels of within the OFDMA data unit 300, in this embodiment.

Each of the OFDM data units 302-1, 302-2, 302-3 conforms to a communication protocol that defines OFDMA communication, such as the HEW communication protocol, in an embodiment. In an embodiment in which the OFDMA data unit 300 corresponds to a downlink OFDMA data unit, the OFDMA data unit 300 is generated by the AP 14 such that each OFDM data unit 302 is transmitted to a respective client station 25 via a respective sub-channel of the WLAN 10 allocated for downlink transmission of the OFDMA data unit 300 to the client station. Similarly, an embodiment in which the OFDMA data unit 300 corresponds to an uplink OFDMA data unit, the AP 14 receives the OFDM data units 302 via respective sub-channels of the WLAN 10 allocated for uplink transmission of the OFDM data units 302 from the client stations, in an embodiment. For example, the OFDM data unit 302-1 is transmitted via a first 20 MHZ sub-channel of the WLAN 10, the OFDM data unit 302-2 is transmitted via a second 20 MHz sub-channel of the WLAN 10, and the OFDM data unit 302-3 is transmitted via a 40 MHz sub-channel of the WLAN 10, in the illustrated embodiment.

In an embodiment, each of the OFDM data units 302 includes a preamble including one or more legacy short training fields (L-STF) 304, one or more legacy long training fields (L-LTF) 306, one or more legacy signal fields (L-SIG) 308, one or more first high efficiency WLAN signal field (HEW-SIG-A) 310, N HEW long training fields (HEW-LTF) and a second HEW signal field (HEW-SIGB) 314. Additionally, each OFDM data unit 302 includes a high efficiency WLAN data portion (HEW-DATA) 318. In an embodiment, each L-LSF field 306, each L-LTF field 308, each L-SIG field 310 and each HEW-SIGA field 312 occupies a smallest bandwidth supported by the WLAN 10 (e.g., 20 MHz). In an embodiment, if an OFDM data unit 302 occupies a bandwidth that is greater than the smallest bandwidth of the WLAN 10, then each L-LSF field 306, each L-LTF field 308, each L-SIG field 310 and each HEW-SIGA field 312 is duplicated in each smallest bandwidth portion of the OFDM data unit 302 (e.g., in each 20 MHz portion of the data unit 302). On the other hand, each HEW-STF field 312, each HEW-LTF field 314, each HEW-SIGB field 316 and each HEW data portion 318 occupies an entire bandwidth of the corresponding OFDM data unit 302, in an embodiment. For example, the OFDM data unit 302-3 occupies 40 MHz, wherein L-LSF field 306, the L-LTF field 308, L-SIG field 310 and HEW-SIGA fields 312 is duplicated in the upper and the lower 20 MHz bands of the OFDM data unit 302-3, while each of the HEW-STF field 312, each of the HEW-LTF fields 314, each of the HEW-SIGB field 316 and each of the HEW data portion 318 occupies the entire 40 MHz bandwidth of the data unit 302, in the illustrated embodiment.

In an embodiment, padding is used in one or more of the OFDM data units 302 to equalize lengths of the OFDM data units 302. Accordingly, the length of each of the OFDM data units 302 correspond to the length of the OFDMA data unit 302, in this embodiment. Ensuring that the OFDM data units 302 are of equal lengths synchronizes transmission of acknowledgment frames by client stations 25 that receive the data units 302, in an embodiment. In an embodiment, each of one or more of the OFDM data units 302 is an aggregate MAC service data units (A-MPDU) (e.g., a very high throughput (VHT) A-MPDU, an HEW MPDU, or another suitable aggregated data unit), which is in turn included in a PHY protocol data unit (PPDU). In another embodiment, each of one or more of the OFDM data units 302 is a single MPDU (e.g., a VHT MPDU, an HEW MPDU, or another suitable non-aggregated data unit) which is in turn included in a PPDU. In an embodiment, padding (e.g., zero-padding) within one or more of the A-MPDUs 302 or single MPDUs 302 is used to equalize the lengths of the data units 302, and to synchronize transmission of acknowledgement frames corresponding to the OFDMA data unit 300.

Figure 4:
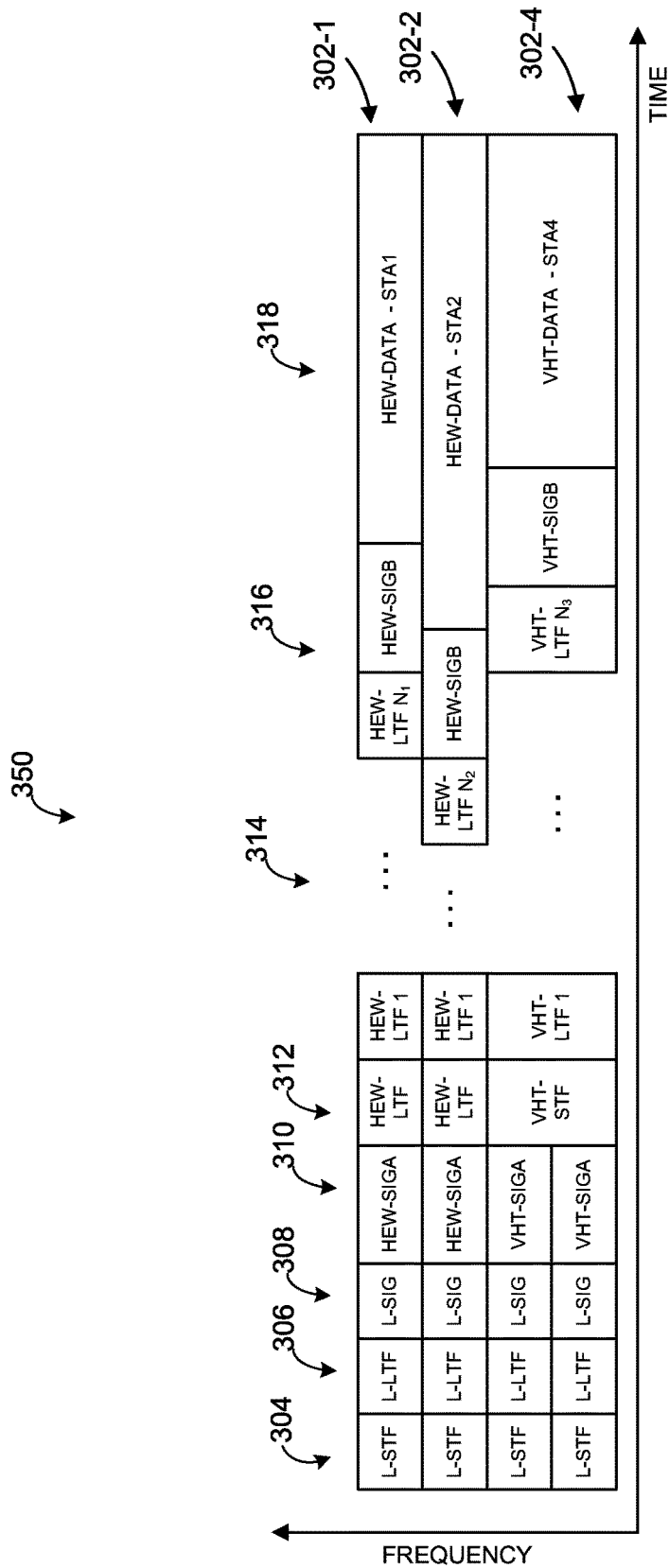
FIG. 4 is a diagram of an example OFDMA data unit, according to another embodiment.

FIG. 4 is a diagram of an example OFDMA data unit 350, according to another embodiment. The OFDMA data unit 350 is similar to the OFDMA data unit 300 of FIG. 3 except that the OFDMA data unit 350 includes an OFDMA data unit 302-4 formatted according to a legacy communication protocol that does not support OFDMA communication (e.g., the IEEE 802.11ac Standard).

In an embodiment, the AP 14 forms OFDMA groups of client stations 25, and informs the client stations 25 that the client stations 25 are members of particular OFDMA groups. For example, in an embodiment, the AP assigns a group number to an OFDMA group of client stations 25, and transmits a management or a control frame that signals the group ID number to the client stations 25 that belong to the OFDMA group. For example, the management or control frame includes the group ID number and a respective unique identifier of each of the client stations 25 that belongs to the group, in an embodiment. In an embodiment, the AP 14 allocates respective OFDM sub-channels to client stations 25 that belong to an OFDMA group, and provides channel allocation information to the client stations 25 of the OFDMA group. In an embodiment, the AP 14 allocates respective OFDM sub-channels to client stations 25 dynamically without pre-defining an OFDMA group. The client stations 25 of the OFDMA group subsequently receive data in the respective OFDM sub-channels allocated to the client stations 25 when the data is transmitted to the client stations 25 in an OFDMA transmission from the AP 14 to the client stations 25, in an embodiment and/or scenario. In another embodiment and/or scenario, the client stations 25 of the OFDMA group subsequently transmit respective data as part of an OFDMA transmission to the AP 14 by transmitting the data in the respective OFDM sub-channels allocated to the client stations 25 by the AP 14.

Figure 5:
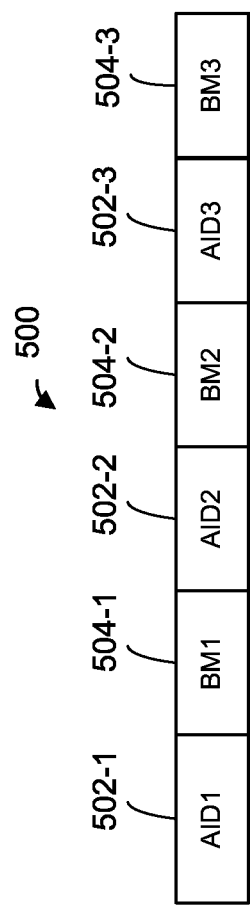
FIG. 5 is an example broadcast block acknowledgment field, according to an embodiment.

FIG. 5 is an example broadcast block acknowledgment field 500, according to an embodiment. In an embodiment, the broadcast block acknowledgment field 500 is included in an acknowledgment frame that the AP 14 transmits to client stations 25 in response to receipt of respective aggregate media access control protocol data units (A-MPDUs) from the client stations 25. The broadcast block acknowledgment field 500 includes a plurality of association identifier (AID) subfields 502 and a corresponding plurality of bitmap subfields 504. In an embodiment, the AID subfields 502 include as many subfields as there are client stations 25 assigned to an OFDMA group and each of the client stations has a corresponding bitmap subfield 504. In another embodiment, the AID subfields 502 include as many subfields as there are client stations 25 that have transmitted respective A-MPDUs prior to the acknowledgment frame. For example, as shown in FIG. 5, the AID subfields 502 include a first AID (AID1) subfield 502-1, a second AID (AID2) subfield 502-2, and a third AID (AID3) subfield 502-3 with corresponding first bitmap (BM1) subfield 504-1, second bitmap (BM2) subfield 504-2, and third bitmap (BM3) subfield 504-3. In one embodiment, the broadcast block acknowledgment field 500 is generated by the host processor 15 (e.g., by a management processing unit of the host processor 15). In another embodiment, at least one of the AID subfields 502, and/or information included therein, are generated at least in part by the MAC processing unit 18. The bitmap subfield 504 includes a bitmap having as many bits as MPDUs transmitted by the corresponding client station 25. For example, in an embodiment, a client station 25 transmits an A-MPDU having six MPDUs to the AP 14 and, in response, the AP 14 transmits an acknowledgment frame having a bitmap subfield 504 with a size of six bits. In this embodiment, each bit of the bitmap indicates whether the corresponding MPDU was successfully received.

Figure 6:
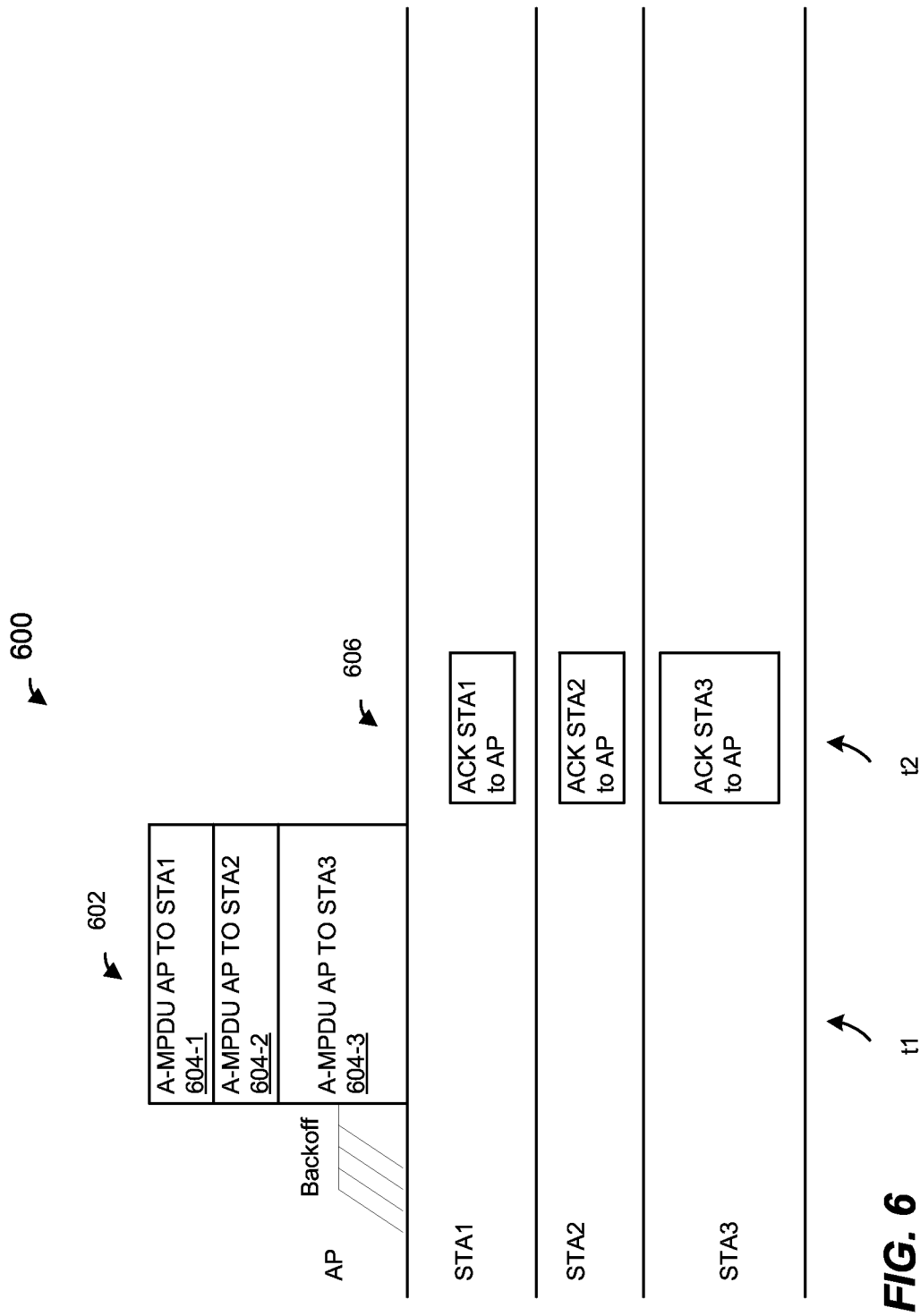
FIG. 6 is diagram illustrating a frame exchange between an AP and multiple client stations, according to an embodiment.

FIG. 6 is diagram illustrating a frame exchange 600 between an AP (e.g., the AP 14) and multiple client stations (e.g., multiple client stations 25), according to an embodiment. During a time t1, the AP 14 transmits an OFDMA data unit 602 directed to a plurality of client stations. In an embodiment, the AP 14 uses a medium access procedure or backoff procedure to determine when to transmit the downlink OFDMA data unit 602. In an embodiment, the backoff procedure is an enhanced distributed channel access (EDCA) backoff procedure (e.g., shared with single user EDCA traffic). In an embodiment, the backoff procedure is a backoff procedure specific to OFDMA. The OFDMA data unit 602 occupies an 80 MHz channel, in the illustrated embodiment. In an embodiment, the data unit 602 is the same as or similar to the data unit 300 of FIG. 3. In an embodiment, prior to transmission of the OFDMA data unit 602, the AP 14 conducts a suitable channel assessment procedure, such as a carrier sense multiple access with collision avoidance procedure (CSMA/CA) procedure, and based on the channel assessment procedure determines a bandwidth available for transmission by the AP 14. In an embodiment, the OFDM channel includes the primary channel of the WLAN 10 and one or more secondary channels of the WLAN 10. For example, the AP 14 determines that the primary 20 MHz channel and three secondary 20 MHz channels of the WLAN 10 are available for 80 MHz transmission by the AP 14, in the illustrated embodiment.

In an embodiment, the OFDMA data unit 602 includes a plurality of OFDM data units 604 directed to respective client stations 25, each OFDM data unit 604 transmitted in a respective sub-channel of the WLAN 10 to a particular client station 25. In particular, a first OFDM data unit 604-1 is directed to a first client station STA1 (e.g., the client station 25-1), a second OFDM data unit 604-2 is directed to a second client station STA2 (e.g., the client station 25-2), and a third OFDM data unit 604-3 is directed to a third client station STA3 (e.g., the client station 25-3), in the illustrated embodiment. In an embodiment, the first OFDM data unit 604-1 occupies the highest 20 MHz sub-channel of the 80 MHz channel, the second OFDM data unit 604-2 occupies the second highest 20 MHz sub-channel of the 80 MHz channel, and the third OFDM data unit 604-3 is transmitted in a 40 MHZ sub-channel that includes the lowest two 20 MHZ sub-channels of the 80 MHz channel.

In an embodiment, the preamble of the OFDMA data unit 600 is transmitted in each of the 20 MHz sub-channels occupied by the OFDMA data unit 602. In an embodiment, the preamble of the OFDMA data unit 600 includes a channel allocation field (e.g., in a signal field of the preamble such as the HEW-SIGA field of the preamble) that indicates to the client stations 25 to which the OFDMA data unit 600 is directed that the client station 25 are intended recipients of different portions of the OFDMA data unit 600. An example of a channel allocation field is described in U.S. patent application Ser. No. 14/538,573, entitled "Medium Access Control for Multi-Channel OFDM in a Wireless Local Area Network," filed on Nov. 11, 2014, the disclosure of which is hereby incorporated herein by reference in its entirety.

Each of the client stations 25 receives the channel allocation field in the primary channel of the WLAN 10 (e.g., in the lowest 20 MHz channel) and determines, based on the channel allocation field, which channel of the WLAN 10 includes data directed to the client station 25, respectively, in an embodiment. The client stations 25 tune to the appropriate sub-channels indicated in the channel allocation field and receive data directed to the client stations 25 via the respective sub-channels allocated to the client station 25. During a time t2, in an embodiment, client stations 25 that successfully receive data in the respective sub-channels allocated to the client stations 25 transmit respective acknowledgement (ACK or BlkAck) frames 606 to the AP 14. In an embodiment, each client station 25 transmits its acknowledgement (ACK or BlkAck) frame 606 in the respective sub-channel allocated to the client station 25. In an embodiment, the AP 14 allocates a sub-channel for the acknowledgement to be transmitted from each client station that is different from a sub-channel allocated for downlink OFDMA transmissions to the corresponding client station. In an embodiment, the AP 14 synchronizes transmission of the ACK frames 606 from the client stations 25 by ensuring that the OFDM data units 604-1, 604-2, 604-3 are of equal length. For example, the AP adds padding bits (e.g., bits having predetermined values such as zero bits or one bits) to data bits in one or more of the data units 604 to equalize lengths of the data units 604, in an embodiment. For example, in an embodiment in which the OFDM data units 604-1, 604-2, 604-3 are A-MPDUs, and the AP 14 utilizes A-MPDU padding in one or more of the data units 604-1, 604-2, 604-3 to ensure that the data units 604-1, 604-2, 604-3 are of the same length. As another example, in an embodiment in which the OFDM data units 604-1, 604-2, 604-3 are MPDUs, and the AP 14 utilizes MPDU padding in one or more of the data units 604-1, 604-2, 604-3 to ensure that the data units 604-1, 604-2, 604-3 are of the same length.

In another embodiment, the ACK frames 606 are not simultaneously transmitted by the client stations 25. For example, transmission of the ACK frames 506 is staggered among the client stations 25, in an embodiment. For example, the AP provides to the client stations 25 indications of different specific times at which to transmit their respective ACK frames 606, or a specific order in which to transmit their respective ACK frames 606, and the client stations 25 transmit the ACK frames 606 at the specific times or in the specific order indicated by the AP, in an embodiment.

In an embodiment, the ACK frames 606 are block acknowledgement (BlkAck) frames that indicate successful or unsuccessful reception of a plurality of data units, such as of a plurality of data units aggregated in the corresponding A-MPDU 602. Generally speaking, as used herein, the terms "acknowledgement frame" and "ACK frame" are used interchangeably and encompass both an acknowledgement frame that acknowledges successful or unsuccessful receipt of a single data unit, and a block acknowledgement frame that acknowledges successful or unsuccessful receipt of multiple data units (e.g., multiple data units transmitted as parts of an aggregated data unit).

In an embodiment, the bandwidth of acknowledgment 606 is not wider than the bandwidth of downlink OFDMA transmission 602, and in each 20 MHz channel occupied by the downlink OFDMA transmission 602, there is at least one sub-channel for transmission of the acknowledgment.

In some embodiments, the AP 14 transmits a control frame, such as a scheduling frame, to the client stations 25 prior to transmission of an OFDMA data unit to the client stations 25. In an embodiment, the control frame that the AP 14 transmits to the client stations 25 prior to transmission of an OFDMA data unit to the client stations 25 is a legacy (e.g., an IEEE 802.11 a or an IEEE 802.11 g) duplicate control frame that is replicated in each smallest bandwidth band (e.g., each 20 MHz band) of the WLAN 10. In an embodiment, the AP 14 transmits the control frame at the beginning of a transmission opportunity (TXOP) to inform the client stations 25 whether the client stations 25 are to receive data from the AP 14 and/or are to transmit data to the AP 14 during the TXOP. The control frame includes downlink and/or uplink channel allocation information that indicates to the client stations 25 that are to receive and/or transmit data which sub-channels to use for reception and/or transmission of data, in an embodiment. In an embodiment, the downlink channel allocation information is carried in a downlink PHY signal field (e.g., a SIG field). In one such embodiment, a separate control frame is omitted. In an embodiment, the client stations 25 are configured to determine their respective downlink sub-channels based on downlink channel allocation information included in the control frame and to subsequently simultaneously receive, via the downlink sub-channels, data from the AP 14 with the other client stations 25 as part of a downlink OFDMA transmission from the AP 14. Similarly, the client stations 25 are configured to determine their respective uplink channels based on uplink channel allocation information included in the control frame and to subsequently simultaneously transmit data to the AP 14 with the other client stations 25 as part of an uplink OFDMA transmission to the AP 14, in an embodiment.

In at least some embodiments in which the AP 14 transmits a control frame to the client stations 25 to signal downlink channel allocation to the client stations 25 for a downlink OFDMA transmission to the client stations 25, such channel allocation information need not be included in a preamble of each of the OFDM data unit transmitted as part of the OFDMA transmission. In one such embodiment, the preamble of each data unit in an OFDMA transmission is generally the same as a preamble used for regular OFDM transmission to single client station 25. For example, with reference to FIGS. 3 and 4, the signal field 310 of each of the data units 302 is the same as a HEW-SIGA field of a data unit transmitted as a regular transmission to a single client station 25. In another embodiment, the preamble of each OFDM data unit included in the OFDMA transition is substantially the same as a preamble used for regular OFDM transmission to single client station 25, but includes an indication that the OFDM data unit is part of an OFDMA transmission to multiple client stations 25. For example, with reference to FIGS. 3 and 4, one or more bits of the signal field 310 is/are set to indicate that the OFDM data units 302 are part of an OFDMA transmission, in an embodiment.

Figure 7:
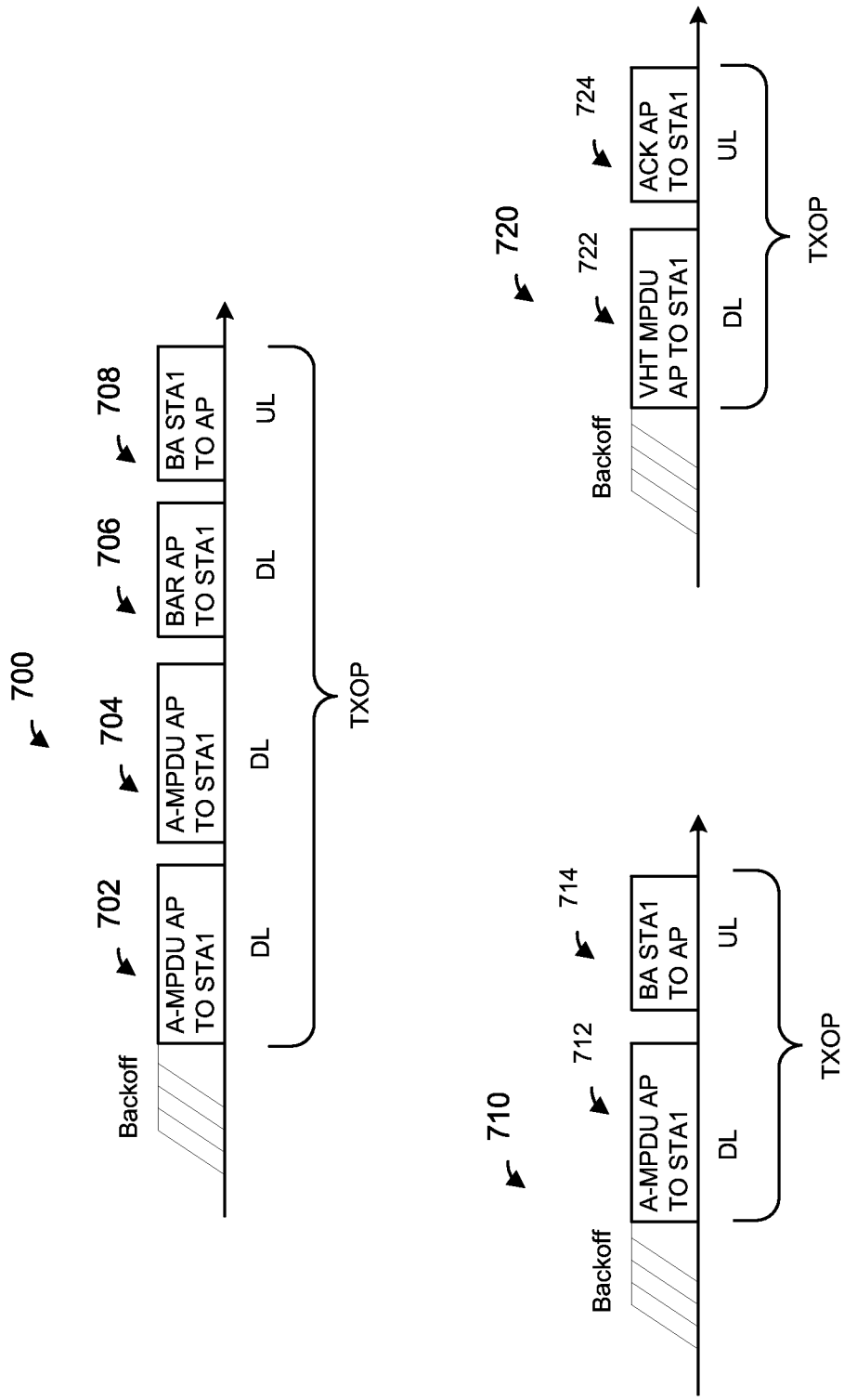
FIG. 7 is a diagram illustrating various acknowledgment types for a transmission opportunity holder, according to an embodiment.

FIG. 7 is a diagram illustrating various acknowledgment types during single user frame exchanges 700, 710, and 720 for a transmission opportunity (TXOP) holder using enhanced distributed channel access (EDCA), according to an embodiment. The frame exchanges 700, 710, and 720 are "single user" in that each includes a transmission of an A-MPDU from a single access point (e.g., the AP 14) to a single client station (e.g., client station 25-1). In an embodiment, an AP 14 obtains a TXOP and transmits one or more A-MPDUs to a client station 25. In the embodiment shown in FIG. 7, each frame exchange 700, 710, and 720 is performed within a TXOP of the AP 14. In an embodiment, the TXOP holder (e.g., the AP 14) indicates the acknowledgment type (e.g., Normal Acknowledgment, Implicit Block Acknowledgment, No Acknowledgment, No Explicit Acknowledgment, Block Acknowledgment) through an Acknowledgment Policy in a header of at least some of its transmitted frames, for example, in a Quality of Service (QoS) control field.

The frame exchange 700 illustrates a Block Acknowledgment where the client station 25 does not provide an immediate acknowledgment to frames received from the AP 14. In the embodiment shown in FIG. 7, during the frame exchange 700, the AP 14 transmits a first A-MPDU 702 and a second A-MPDU 704 in a downlink (DL) direction to the client station 25 (STA1). In an embodiment, the client station 25 waits for receipt of a block acknowledgment request (BAR) 706 from the AP 14 before sending a block acknowledgment 708 to the AP 14. The frame exchange 710 illustrates an Implicit Block Acknowledgment where the client station 25 transmits a block acknowledgment 714 in response to and upon receipt of an A-MPDU 712. The frame exchange 720 illustrates a Normal Acknowledgment where the client station 25 transmits an acknowledgment 724 in response to and upon receipt of a very high throughput (VHT) single MPDU or MPDU 722.

In some embodiments and/or scenarios, the AP 14 selects one or more quality of service indicators (e.g., traffic classes or access categories) for a frame exchange. In some embodiments, the AP 14 selects the quality of service indicator based on a medium access procedure used to trigger the frame exchange. In an embodiment, the block acknowledgment allows the AP 14 to select frames having different traffic classes (TC) and/or frames intended for different receiver addresses (RA) for inclusion within a same A-MPDU. In an embodiment, the AP 14 selects data frames with a same access category (AC) to be encapsulated within an A-MPDU. In an embodiment, responding frames (e.g., the acknowledgments 708, 714, and 724) have a same bandwidth as a preceding frame which elicits the responding frame (e.g., the block acknowledgment request 706, the A-MPDU 712, or the A-MPDU 722), with the exception of clear to send (CTS) frames which may have a smaller bandwidth than a preceding request to send (RTS) frame. When transmitting a frame, the TXOP holder uses a bandwidth that is not wider than i) a preceding frame or ii) the elicited acknowledgment when a duplicate frame was not previously transmitted. Otherwise, the TXOP holder uses a bandwidth that is not wider than a preceding duplicate CTS frame.

Figure 8:
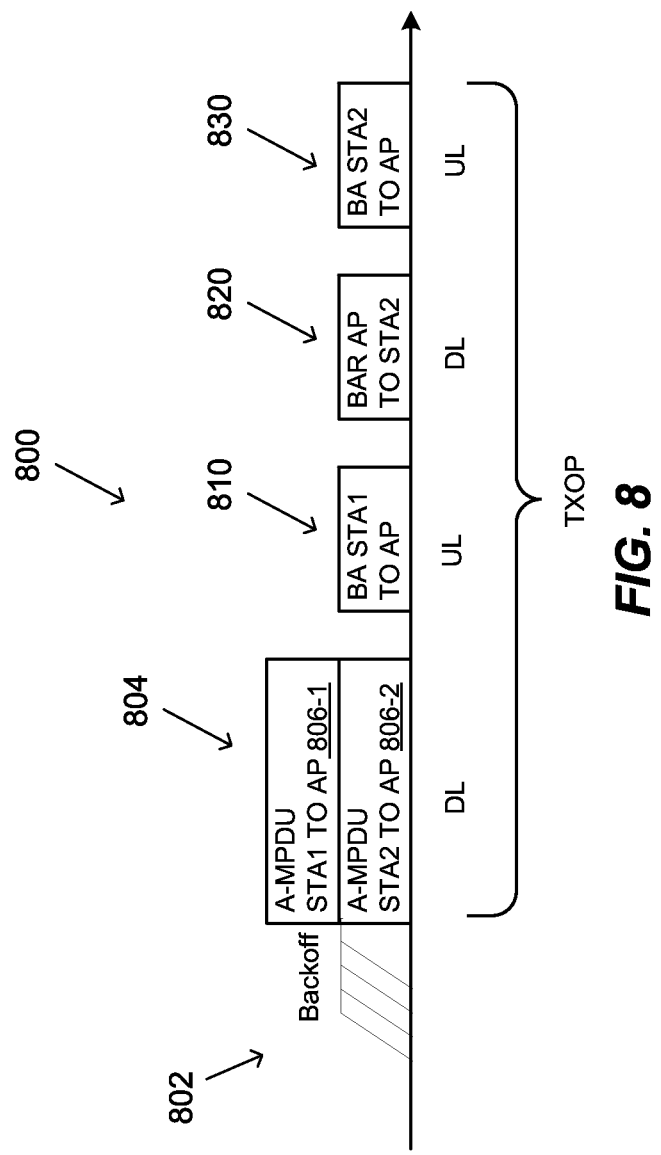
FIG. 8 is a diagram illustrating a block acknowledgment during a frame exchange for a TXOP holder, according to an embodiment.

FIG. 8 is a diagram illustrating a block acknowledgment during a frame exchange 800 for a TXOP holder using EDCA, according to an embodiment. In an embodiment, the frame exchange 800 is a "multi-user" in that an access point (e.g., the AP 14) performs a multi-user multiple input, multiple output (MU-MIMO) transmission 804 having separate OFDM data units 806-1 and 806-2 intended for two client stations STA1 and STA2 (e.g., client stations 25-1 and 25-2). In an embodiment, the AP 14 obtains a TXOP and simultaneously transmits a first A-MPDU 806-1 to the client station 25-1 and transmits a second A-MPDU 806-2 to the client station 25-2 using different sub-channels (i.e., space time streams) of a MU-MIMO communication channel. In the embodiment shown in FIG. 8, the MU-MIMO transmission 804 includes data frames from a same access category (AC). In the simultaneously transmitted A-MPDUs 806-1 and 806-2, data frames from a same AC are encapsulated in each A-MPDU by the AP 14, in an embodiment. In some embodiments, when TXOP sharing is allowed, data frames from different ACs are encapsulated in different A-MPDUs within the TXOP. In one such embodiment, the MPDUs from a primary AC have higher priority to be transmitted. When TXOP sharing is not allowed, data frames from the primary AC can be encapsulated in different A-MPDUs.

In the embodiment shown in FIG. 8, the A-MPDU 806-1 corresponds to an indication of an Implicit Block Acknowledgment and the A-MPDU 806-2 corresponds to an indication of a Block Acknowledgment. Based on the indication of the Implicit Block Acknowledgment, the client station 25-1 transmits a block acknowledgment 810 to the AP 14 in response to and upon receipt of the A-MPDU 806-1. The client station 25-2, based on the indication of the Block Acknowledgment, waits for receipt of a block acknowledgment request (BAR) 820 from the AP 14 before sending a block acknowledgment 830 to the AP 14. The block acknowledgment 830, in some embodiments, is transmitted using a same bandwidth as the original MU-MIMO transmission 804. For example, in an embodiment, the MU-MIMO transmission 804 occupies a bandwidth of 40 MHz (e.g., 2×20 MHz sub-channels) and the block acknowledgment 830 is duplicated across a same bandwidth.

Figure 9:
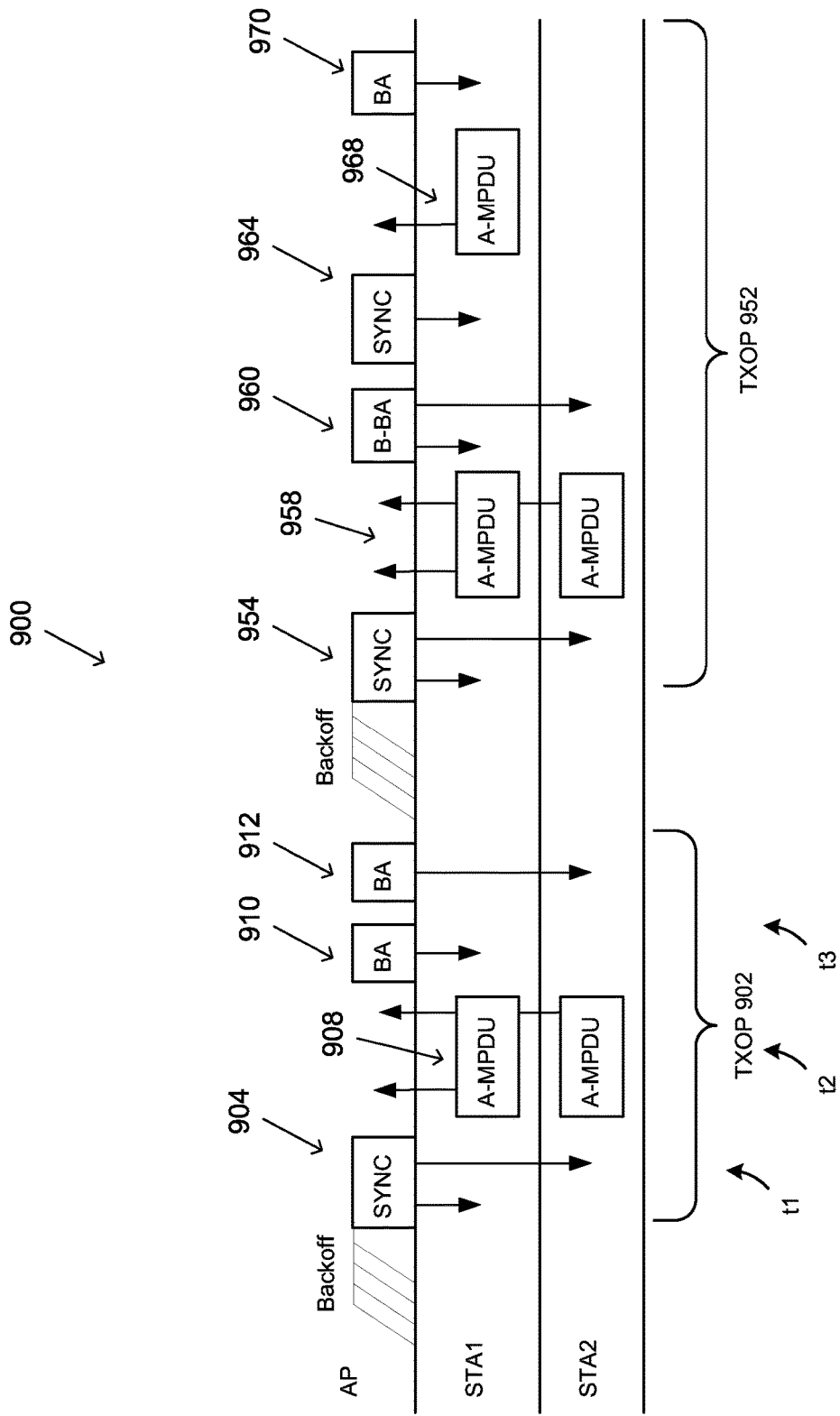
FIG. 9 is a frame exchange between an AP and a plurality of client stations that includes an uplink transmission of data from the plurality client stations to the AP, according to an embodiment.

FIG. 9 is a diagram illustrating a frame exchange 900 between an AP (e.g., AP 14) and a plurality of client stations (e.g., client stations 25) that includes an uplink transmission of data from the plurality of client stations to the AP, according to an embodiment. In some embodiments, the uplink transmission includes a MU-MIMO data transmission. In some embodiments, the uplink transmission includes an OFDMA data transmission.

During a time t1, the AP 14 transmits an uplink scheduling frame 904 to a plurality of client stations 25. In an embodiment, the time t1 begins at the beginning of a TXOP 902 obtained by (e.g., based on a suitable channel assessment procedure, such as CSMA/CA), or scheduled for (e.g., through a target wake time (TWT) service period), the AP 14. In an embodiment, the uplink scheduling frame 904 provides, to the plurality of client stations 25, MU-MIMO uplink scheduling information to be used for transmission of an uplink OFDM data unit during the TXOP 902 via an allocated space time stream. In an embodiment, the uplink scheduling frame 904 includes MU-MIMO scheduling information, for example, one or more identifiers of space time streams for the client stations. In an embodiment, the scheduling frame 904 further indicates, to each of the client stations STA1 and STA2 a length or duration to be used for transmission of an uplink data unit during the TXOP 902. In another embodiment, the uplink scheduling frame 904 provides, to the plurality of client stations 25, OFDMA uplink scheduling information to be used for transmission of an uplink OFDM data unit during the TXOP 902 via a sub-channel of the OFDM communication channel. In an embodiment, the uplink scheduling frame 904 includes OFDMA scheduling information, for example, one or more identifiers of transmission bandwidth for the client stations. In an embodiment, the scheduling frame 904 further indicates, to each of the client stations STA1 and STA2 a length or duration to be used for transmission of an uplink data unit during the TXOP 902.

In an embodiment, the scheduling frame 904 is a synchronization (SYNC) frame, control frame, trigger frame, or other suitable frame. In an embodiment, the scheduling frame 904 is a non-data packet (NDP) frame that omits a payload. In one embodiment in which the scheduling frame 904 in an NDP frame, MAC layer information, e.g., receiver address, transmitter address, etc., is included in a signal field of a PHY preamble of the scheduling frame 904. In an embodiment and/or scenario, the uplink scheduling frame 904 is duplicated in each smallest bandwidth portion (e.g., in each 20 MHz) of the entire bandwidth of the TXOP 902. In another embodiment and/or scenario, the scheduling frame 904 occupies the entire bandwidth of the TXOP 902, for example when each of the client stations 25 to which the scheduling frame 904 is transmitted is capable of operating in the entire bandwidth of the TXOP 902. In another embodiment and/or scenario, the uplink scheduling frame 904 is duplicated in every bandwidth portion of the entire bandwidth of the TXOP 902 so as to allow each client station 25 to which the scheduling frame 904 is transmitted to receive and decode the scheduling frame 904, according to capabilities of the client stations 25 to which the scheduling frame 904 is directed. For example, if the entire bandwidth of the TXOP is 160 MHz, but at least one of the client stations 25 to which the scheduling frame 904 is directed is capable to operate with a maximum bandwidth of 80 MHz, then the scheduling frame 904 occupies 80 MHz and is duplicated in each 80 MHz portion of the entire bandwidth of the TXOP (i.e., in the lower 80 MHz portion and the upper 80 MHz portion), in an embodiment.

The scheduling frame 904 indicates different sub-channels allocated for uplink transmission by the client stations, in various embodiments. While only two client stations STA1 and STA2 are shown in FIG. 9, the scheduling frame 904 indicates sub-channels allocated for three, four, or another suitable number of client stations in other embodiments and/or scenarios. In an embodiment, the scheduling frame 904 indicates a first space time stream allocated to STA1 and a second space time stream allocated to STA2 for a MU-MIMO transmission. In another embodiment, the scheduling frame 904 indicates a first 20 MHz bandwidth of a 40 MHz OFDM communication channel allocated to STA1 and a second 20 MHz bandwidth of the 40 MHz OFDM communication channel allocated to STA2 for an OFDMA transmission. In other embodiments, the AP 14 allocates other suitable combinations of sub-channels to the client stations. In an embodiment, the AP 14 allocates an equal number of sub-channels to each client station. In another embodiment, the AP 14 allocates an unequal number of sub-channels to the client stations. In one such embodiment, the AP 14 allocates a 20 MHz sub-channel to a first client station and a 60 MHz sub-channel (e.g., three separate 20 MHz sub-channels) to a second client station.

During a time t2, the plurality of client stations 25 transmit respective OFDM data units 908 to the AP 14. Time t2 at each client station 25 begins upon expiration of a predetermined time interval, such as for example a time interval corresponding to a short inter-frame space (SIFS), after completion of reception, of the scheduling frame 904 at the client station 25, in an embodiment. In another embodiment, a predetermined time period that is greater than SIFS is defined, and time t2 at each client station 25 begins upon expiration of a predetermined time interval corresponding to the predetermined time interval greater than SIFS. For example, a predetermined time period that is greater than SIFS and less than point coordination function (PCF) interframe space (PIFS) is defined. The greater predetermined time interval may provide sufficient time for the client stations 25 to decode the scheduling frame 904 and to prepare for uplink transmission based on the uplink scheduling information provided by the scheduling frame 904, in at least some embodiments. Additionally or alternatively, the scheduling frame 904 includes one or more padding bits at the end of the scheduling frame 904 to provide sufficient time for the client stations 25 to prepare for uplink transmission based on the uplink scheduling information provided by the scheduling frame 904, in some embodiments. For example, a MAC header included in the scheduling frame 904 indicates a length of a valid payload, wherein the one or more padding bits follow the valid payload, in an embodiment. Further, a signal field of a PHY preamble of the scheduling frame 904 includes an indication of the entire length of the scheduling frame 904, which includes the one or more padding bits at the end of the scheduling frame 904, in an embodiment.

In an embodiment, each client station 25 transmits its OFDM data unit 908 during the time t2 in a respective sub-channel, allocated to the client station 25, as indicated in the scheduling frame 904. In an embodiment, the length or duration of each of the OFDM data units 908 corresponds to the length or duration indicated in the scheduling frame 904.

During a time t3, the AP 14 transmits respective ACK frames 910 and 912 to the client stations 25 (STA1 and STA2) acknowledging receipt of the OFDM data units 908 from the client stations 25. Time t3 begins upon expiration of a predetermined time interval, such as for example a time interval corresponding to a short inter-frame space (SIFS), after completion of reception of the OFDM data units 908 at the AP 14, in an embodiment. In an embodiment, the AP 14 transmits the ACK frames 910 and 912 to the client stations 25, as parts of a MU-MIMO transmission to the client stations 25, in the respective sub-channels allocated to the client stations 25 indicated in the scheduling frame 904 (e.g., in a same bandwidth as the corresponding scheduling frame). In another embodiment, the AP 14 transmits the ACK frames 910 and 912 to the client stations 25 as parts of an OFDMA transmission to the client stations 25 in the respective sub-channels allocated to the client stations 25 indicated in the scheduling frame 904. In some embodiments, an acknowledgment policy indicates whether an acknowledgment to an uplink OFDM data unit is required or optional and whether the acknowledgment should be sent in response to the receipt of the OFDM data unit or delayed. In an embodiment, the AP 14 determines an order in which acknowledgments are to be transmitted in response to receipt of the uplink OFDM data units from the client stations. In some embodiments, the ACK frames 910 and 912 are duplicated in each smallest bandwidth portion (e.g., in each 20 MHz) of the entire bandwidth of the TXOP 902. For example, in an embodiment, the AP transmits a legacy OFDM data unit as the ACK frames 910 and 912.

In an embodiment, the AP 14 is configured to transmit a broadcast acknowledgement frame 960 instead of the ACK frames 910 and 912. FIG. 9 illustrates a TXOP 952 of the AP 14, during which the AP transmits a scheduling frame 954 and receives uplink OFDM data units 958 from the client stations 25. The TXOP 952 is generally similar to the TXOP 902, except that the AP 14 transmits a broadcast acknowledgement frame 960 that includes respective acknowledgements for the client stations 25 and omits the ACK frames 910 and 912. In an embodiment, the broadcast acknowledgment frame 960 includes the broadcast block acknowledgment field 500, as described above with respect to FIG. 5. In some embodiments, the AP 14 performs more than one frame exchange during a TXOP. In the embodiment shown in FIG. 9, the TXOP 952 includes a first frame exchange (i.e., scheduling frame 954, uplink OFDM data units 958, and broadcast acknowledgment frame 960) and a second frame exchange. The second frame exchange includes a scheduling frame 964, an uplink OFDM data unit 968, and a block acknowledgment frame 970.

In some embodiments, the client station 25 is configured to respond to a scheduling frame without determining whether the sub-channel indicated in the scheduling frame is busy during a time period between the receipt of the scheduling frame and the transmission of the uplink OFDM data unit. In other embodiments, the client station 25 is configured to determine whether the allocated sub-channel is busy. In an embodiment, the client station is allocated one sub-channel and in response to a determination that the one sub-channel is busy, the client station omits transmitting the uplink OFDM data unit. In an embodiment, when at least one 20 MHz channel that covers the client station's sub-channel is busy, the sub-channel of the client station is determined to be busy. In other embodiments, the client station is allocated a primary 20 MHz channel and at least one additional sub-channel is allocated to the STA. In another embodiment, when at least a portion of the client station's sub-channel is determined to be busy (e.g., a 20 MHz bandwidth portion is busy within a 40 MHz sub-channel), the client station omits transmitting uplink OFDM data units on only those sub-channels which are determined to be busy. In some embodiments, the client station 25 determines whether a primary channel or sub-channel of a communication channel is busy using a network access allocation (NAV) timer. In some embodiments, the client station 25 determines whether a non-primary channel is busy based on an idle period corresponding to a point coordination function (PCF) interframe space (PIFS) between the receipt of the scheduling frame and the transmission of the uplink OFDM data unit. Other interframe spaces can also be used for an idle/busy determination. In an embodiment, a client station makes an idle/busy determination in an entire bandwidth of a trigger frame (e.g., the synchronization frame 904). If the determination result is busy, the client station will not transmit the uplink OFDMA frames.

In an embodiment, the uplink OFDM data unit 908 acts as an acknowledgment of the scheduling frame 904. In one such embodiment, the AP 14 determines whether the scheduling frame 904 was transmitted correctly based upon whether an uplink OFDM data unit is received after transmission of the scheduling frame 904. In an embodiment, for example, when the AP 14 receives the uplink OFDM data unit from at least one client station that responds to a first scheduling frame of a TXOP, the AP continues to use the TXOP for frame exchanges. In another embodiment, when the AP does not receive an uplink OFDM data unit in response to the scheduling frame, the AP does not send downlink OFDM data units for the remainder of the TXOP to those client stations that did not respond.

In an embodiment, the total bandwidth of the uplink OFDMA transmission is determined based on the bandwidth of the trigger frame. In one such embodiment, the sub-channel of a client station does not include a 20 MHz channel that is not covered by the bandwidth of the trigger frame. In an embodiment, in each 20 MHz channel that is covered by the transmission of the trigger frame, there is at least one sub-channel allocated to a client station.

FIG. 10 is a frame exchange between an AP 14 and a plurality of client stations 25 that includes uplink OFDMA transmission of data from the plurality client stations 25 to the AP 14, according to another embodiment. In some embodiments, the AP uses the backoff procedure to determine when to transmit the uplink scheduling frame 1002. In an embodiment, the backoff procedure use the EDCA backoff procedure (shared with single user EDCA traffic). In an embodiment, the backoff procedure is a backoff procedure specific to OFDMA. During a time t1, the AP 14 transmits an uplink scheduling frame 1002 to a plurality of client stations 25. In an embodiment, the uplink scheduling frame 1002 is generally similar to the uplink scheduling frame 904. In an embodiment, the time t1 begins at the beginning of a TXOP obtained by (e.g., based on a suitable channel assessment procedure, such as CSMA/CA), or scheduled for (e.g. through a target wake time (TWT) service period), the AP 14. In an embodiment, the uplink scheduling frame 1002 provides, to the plurality of client stations 25, OFDMA uplink scheduling information to be used for transmission of an uplink OFDMA data unit during the TXOP. In an embodiment, the scheduling frame 1002 further indicates, to each of the client stations STA1, STA2, STA3, a length or duration to be used for transmission of an uplink data unit during the TXOP.

In an embodiment and/or scenario, the uplink scheduling frame 1002 is duplicated in each smallest bandwidth portion (e.g., in each 20 MHz) of the entire bandwidth of the TXOP. In another embodiment and/or scenario, the scheduling frame 1002 occupies the entire bandwidth of the TXOP, for example when each of the client stations 25 to which the scheduling frame 1002 is transmitted is capable of operating in the entire bandwidth of the TXOP. In another embodiment and/or scenario, the uplink scheduling frame 1002 is duplicated in every bandwidth portion of the entire bandwidth of the TXOP so as to allow each client station 25 to which the scheduling frame 1002 is transmitted to receive and decode the scheduling frame 1002, according to capabilities of the client stations 25 to which the scheduling frame 1002 is directed.

The scheduling frame 1002 indicates respective sub-channels allocated for uplink OFDMA transmission by three client stations STA1, STA2 and STA3, in the illustrated embodiment. For example, the scheduling frame 1002 indicates channel allocation within an 80 MHz channel, and indicates that (i) the highest 20 MHz sub-channel of the 80 MHz channel is allocated to STA2, (ii) the second highest 20 MHz sub-channel of the 80 MHz channel is allocated to STA1 and (iii) a 40 MHz sub-channel that includes the second lowest 20 MHz sub-channel and the lowest 20 MHz sub-channel is allocated to STA0, in an embodiment.

During a time t2, the plurality of client stations 25 transmit respective OFDM data units 1006 that collectively form an OFDMA data unit 1004 to the AP 14. The OFDM data units 1006 are generally similar to uplink OFDM data unit 908, except that the client station STA1 does not respond to the scheduling frame 1002, for example, because the client station STA1 does not receive the trigger frame correctly or detects a busy medium in its allocated sub-channel. In an embodiment, each client station 25 transmits its OFDM data unit 1006 during the time t2 in a respective sub-channel, allocated to the client station 25, as indicated in the scheduling frame 1002. In an embodiment, the length or duration of each of the OFDM data units 1006 corresponds to the length or duration indicated in the scheduling frame 1002.

During a time t3, the AP 14 transmits respective ACK frames 1008 to the client stations 25 (STA0, STA2) acknowledging receipt of the OFDM data units 1006 from the client stations 25. The ACK frames 1008 are generally similar to the ACK frames 910 and 912, in an embodiment. In another embodiment, the AP 14 transmits a broadcast acknowledgement frame that includes respective acknowledgements for the client stations 25 (STA0, STA2). In an embodiment, the AP 14 transmits the ACK frames 1008 to the client stations 25, as parts of an OFDMA transmission to the client stations 25, in the respective sub-channels allocated to the client stations 25 indicated in the scheduling frame 1002. In an embodiment, a negative acknowledgment (NAK) is transmitted to STA1 because the AP did not receive uplink frames from STA1 in t2. In an embodiment, the NAK is a Quality of Service (QoS) Null frame or an MPDU Delimiter. In an embodiment, without bandwidth protection provided by a request to send/clear to send (RTS/CTS) exchange, the scheduling frame determines a bandwidth of a frame exchange and subsequent frame exchanges within a TXOP. In the illustrated embodiment, the AP 14 transmits the ACK frames 1008 to each of the plurality of client stations, including the NAK to the client station STA1, in order to maintain the entire bandwidth (e.g., 80 MHz, including the 20 MHz allocated to STA1) of the communication channel. In the illustrated embodiment, the client station STA1 transmits an uplink OFDM data unit without determining whether the sub-channel indicated in the scheduling frame 1012 is busy.

In the illustrated embodiment of FIG. 10, the AP 14 transmits an additional scheduling frame 1012 during a same TXOP as the 1002. The scheduling frame 1012 indicates respective sub-channels allocated for uplink OFDMA transmission by the three client stations STA0, STA1 and STA2, in an embodiment. For example, the AP 14 makes additional attempts to use the second highest 20 MHz sub-channel to determine whether the sub-channel is no longer busy.

FIG. 11 is a frame exchange 1100 between an AP and a plurality of client stations that includes uplink OFDMA transmission of data from the plurality client stations to the AP, according to another embodiment. The frame exchange 1100 is generally similar to the frame exchange 1000, except that a scheduling frame 1112 is transmitted within a same TXOP after a scheduling frame 1102 allocates a total bandwidth that is less than the scheduling frame 1102. In the embodiment shown, the highest and the second highest 20 MHz sub-channels of the 80 MHz channel are not allocated by the scheduling frame 1112.

Figure 12:
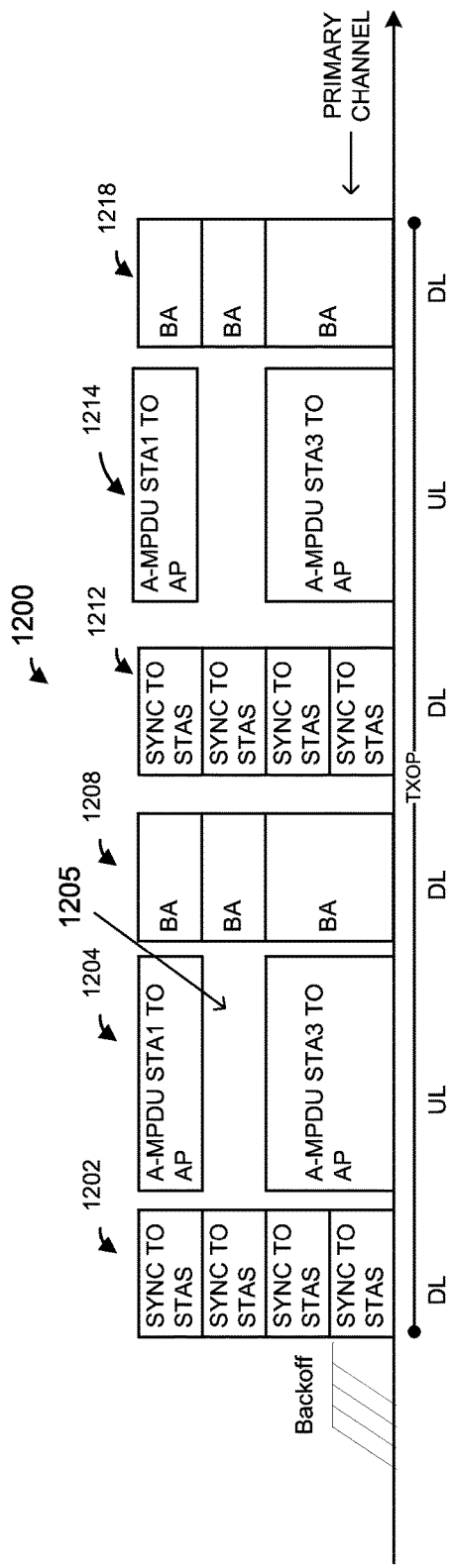
FIG. 12 is a frame exchange between an AP and a plurality of client stations that includes uplink OFDMA transmission of data from the plurality client stations to the AP, according to another embodiment.

FIG. 12 is a frame exchange 1200 between an AP and a plurality of client stations that includes uplink OFDMA transmission of data from the plurality client stations to the AP, according to another embodiment. The frame exchange 1200 is generally similar to the frame exchange 1000, except that the sub-channel allocated to the client station STA1 is not used for the client station STA1 in the following OFDMA transmission when the AP 14 does not receive frames in the first uplink frame exchange from the client station STA1 in its cub-channel. In the illustrated embodiment, the second highest 20 MHz sub-channel allocated to the client station STA1 is not used during the TXOP. In another embodiment, the unused sub-channel is allocated to another client station for a remainder of the TXOP.

Figure 13:
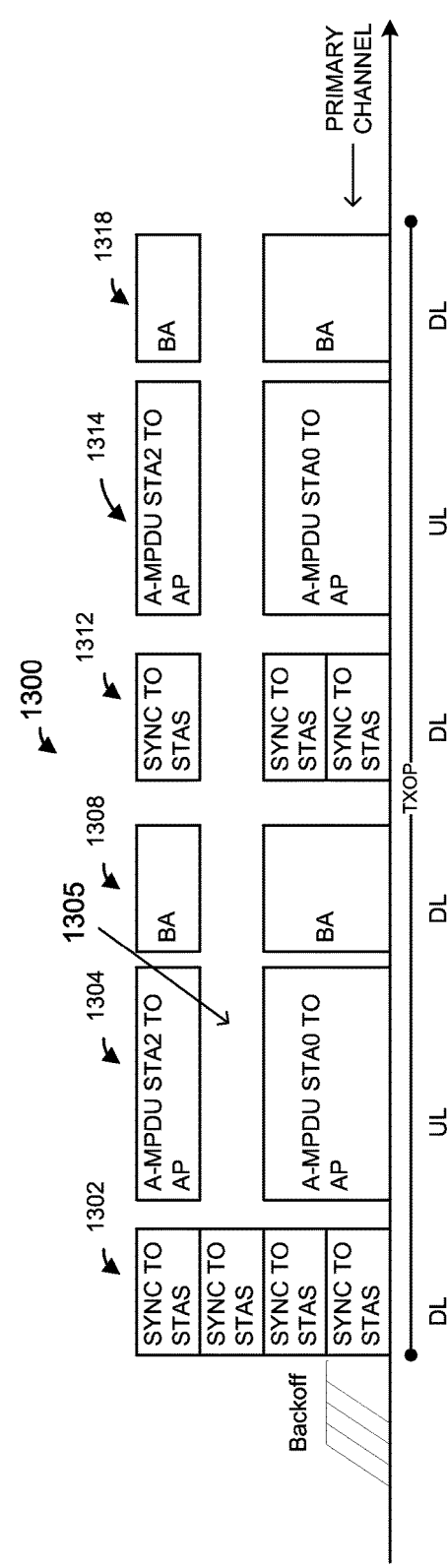
FIG. 13 is a frame exchange between an AP and a plurality of client stations that includes uplink OFDMA transmission of data from the plurality client stations the AP, according to an embodiment.

FIG. 13 is a frame exchange 1300 between an AP and a plurality of client stations that includes uplink OFDMA transmission of data from the plurality client stations the AP, according to an embodiment. The frame exchange 1300 is generally similar to the frame exchange 1200, except that when the AP 14 does not receive an uplink OFDM data unit on a sub-channel 1305 allocated to a client station, the AP 14 does not use the allocated sub-channel for a remainder of the TXOP.

FIG. 14 is a frame exchange 1400 between an AP and a plurality of client stations that includes uplink OFDMA transmission of data from the plurality client stations the AP, according to an embodiment. The frame exchange 1400 is generally similar to the frame exchange 1000 of FIG. 10, except that in the frame exchange 1400, a scheduling frame 1402 indicates noncontiguous channel allocation to a plurality of client stations 25. In an embodiment, prior to transmitting the scheduling frame 1402, the AP 14 detects that a particular sub-channel 1401 is currently not available (e.g., busy). For example, the AP 14 detects that the second highest 20 MHz sub-channel of the 80 MHz channel is busy, while the remaining 20 MHz sub-channels of the 80 MHz are available. Then, during a time t1, the AP 14 transmits the scheduling frame 1402 on each of the available sub-channels of the 80 MHz channel. The scheduling frame 1402 is similar to the scheduling frame 902 except that the scheduling frame 1402 indicates channels allocated to STA0 and STA2, but not STA1, in the illustrated embodiment. In particular, the scheduling frame 1402 indicates that (i) the highest 20 MHz sub-channel of the 80 MHz channel is allocated to STA2, and (ii) a 40 MHz sub-channel that includes the second lowest 20 MHz sub-channel and the lowest 20 MHz sub-channel is allocated to STA0, in the illustrated embodiment.

In an embodiment, during a time t2, stations STA0 and STA2 transmit respective OFDM data units 1404 that collectively form an OFDMA data unit to the AP 14. In an embodiment, the client stations STA0 and STA2 transmit their respective OFDM data units 1404 in a respective non-contiguous sub-channels allocated to the client stations STA0 and STA2, as indicated in the scheduling frame 1402. During a time t3, the AP 14 transmits respective ACK frames 1408 to the client stations SATO and STA2 acknowledging successful receipt of the OFDM data units 1404 from the client stations STA0 and STA2, in an embodiment. The AP transmits the ACK frame 1408 to the client stations STA0 and STA2, as parts of an OFDMA transmission to the client stations STA0 and STA2, in the respective non-contiguous sub-channels allocated to the client stations STA0 and STA2, in an embodiment. In another embodiment, the AP 14 transmits a broadcast acknowledgement frame that includes respective acknowledgements for the client stations 25 (STA0 and STA2).

While an 80 MHz communication channel is allocated to the client stations in the illustrated embodiment, the AP 14 selects other sub-channel allocations (e.g., 60 MHz, 100 MHz, 120 MHz, 140 MHz, etc.) in other embodiments and/or scenarios. In an embodiment, the AP 14 selects contiguous blocks of 40 MHz, 80 MHz, or 160 MHz for an uplink MU-MIMO transmission. In some embodiments, a physical layer clear channel assessment (PHY-CCA) provides an idle/busy indication for each 20 MHz sub-channel of a communication channel. In an embodiment, the PHY-CCA is redefined to provide at least some sub-channel allocations.

FIG. 15 is a frame exchange 1500 between an AP and a plurality of client stations that includes uplink OFDMA transmission of data from the plurality client stations the AP, according to an embodiment. The frame exchange 1500 is generally similar to the frame exchange 1000 of FIG. 10, except that in the frame exchange 1500, the total bandwidth of the OFDMA transmission is not one of 20/40/80/160/80+ 80 MHz. In an embodiment, prior to transmitting the scheduling frame 1502, the AP 14 detects that a particular sub-channel 1501 is currently not available (e.g., busy). For example, the AP 14 detects that the highest 20 MHz sub-channel of the 80 MHz channel is busy, while the remaining 20 MHz sub-channels of the 80 MHz are available. Then, during a time t1, the AP 14 transmits the scheduling frame 1502 on each of the available sub-channels of the 80 MHz channel. The scheduling frame 1502 is similar to the scheduling frame 902 except that the scheduling frame 1502 indicates channels allocated to STA0 and STA1, but not STA2, in the illustrated embodiment. In particular, the scheduling frame 1502 indicates that (i) the second highest 20 MHz sub-channel of the 80 MHz channel is allocated to STA1, and (ii) a 40 MHz sub-channel that includes the second lowest 20 MHz sub-channel and the lowest 20 MHz sub-channel is allocated to STA0, in the illustrated embodiment.

Figure 16:
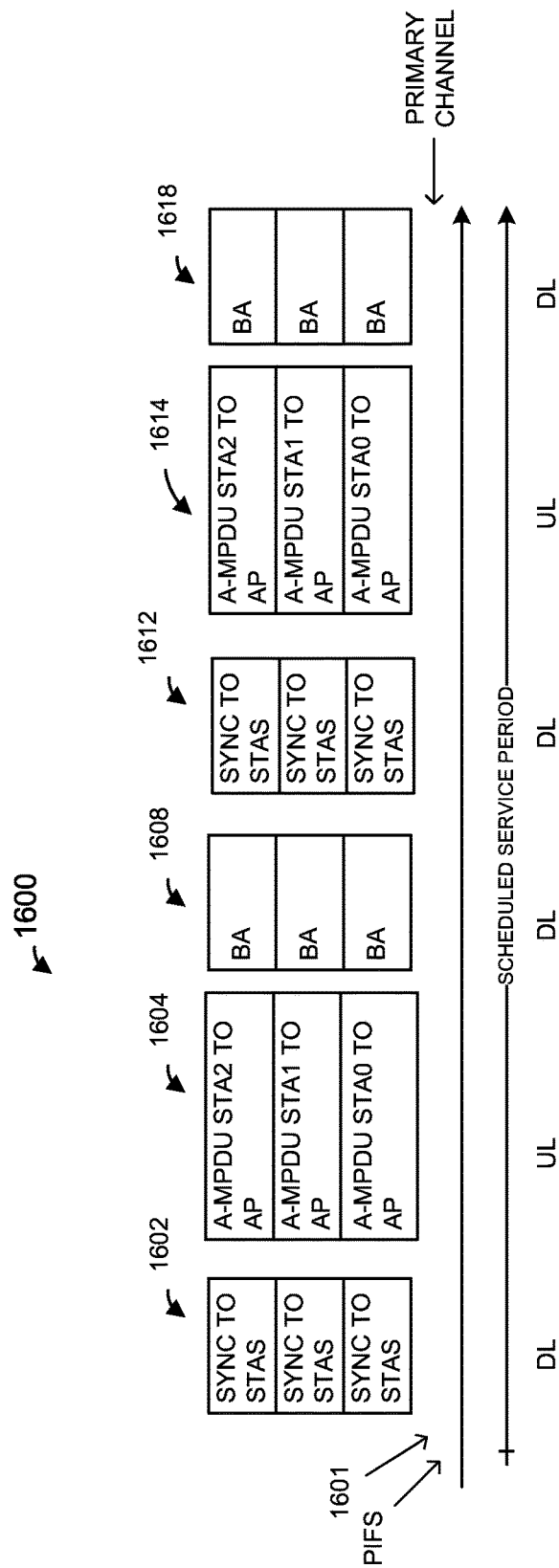
FIG. 16 is a frame exchange between an AP and a plurality of client stations that includes uplink OFDMA transmission of data from the plurality client stations the AP, according to another embodiment.

FIG. 16 is a frame exchange 1600 between an AP and a plurality of client stations that includes uplink OFDMA transmission of data from the plurality client stations the AP, according to another embodiment. In the frame exchange 1600, the AP 14 determines that a primary sub-channel 1601 of an OFDM communication channel is busy. In an embodiment, the frame exchange 1600 occurs during a scheduled service period. In this embodiment, the AP 14 determines an availability of the sub-channel 1601 of the OFDM communication channel based on an idle state during a point coordination function interframe space (PIFS). In an embodiment, the AP 14 performs the frame exchange 1600 using only the sub-channels determined to be not busy.

Figure 17:
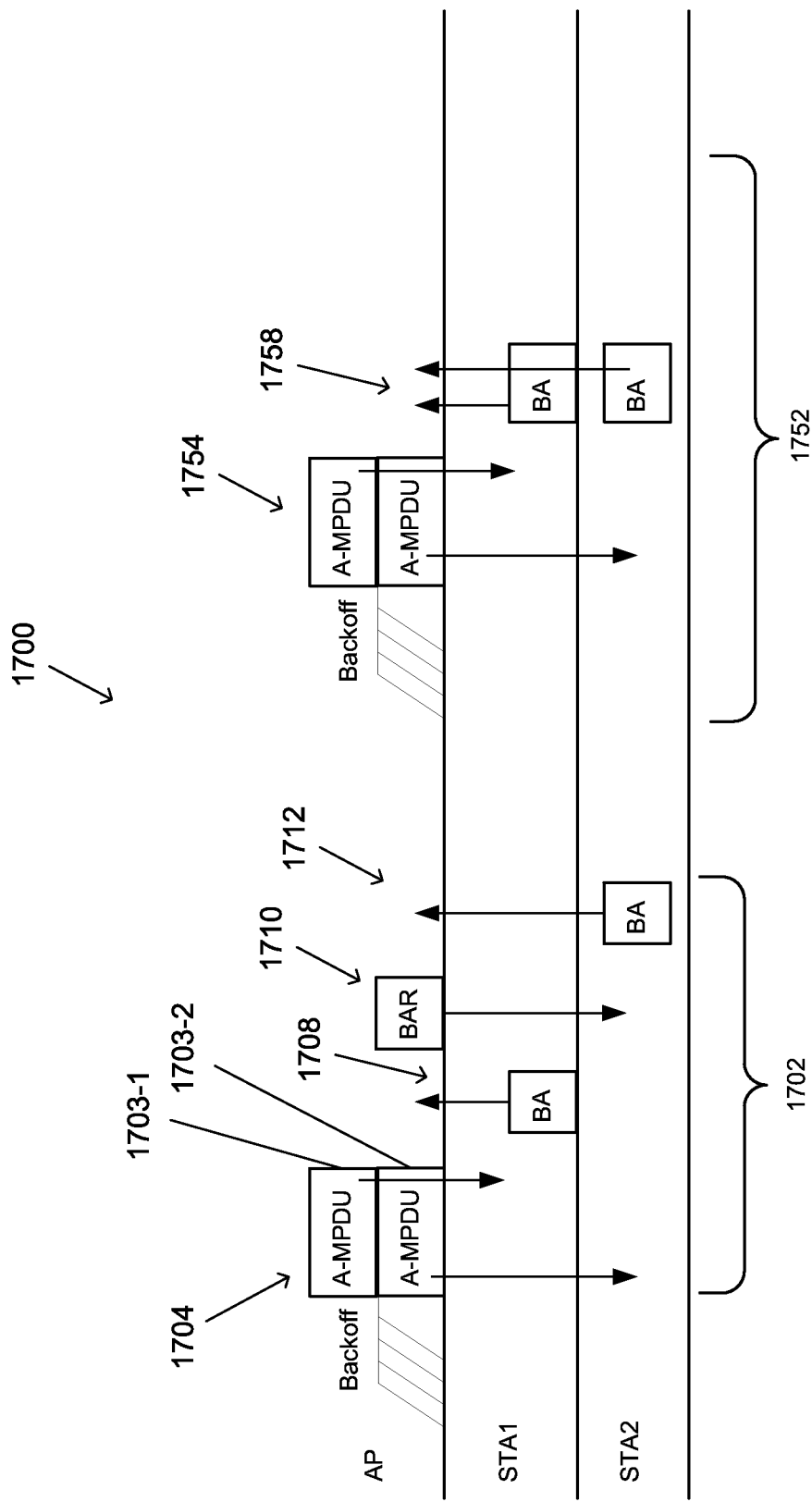
FIG. 17 is a frame exchange between an AP and a plurality of client stations that includes downlink OFDMA transmission of data from the AP to the plurality client stations, according to an embodiment.

FIG. 17 is a frame exchange 1700 between an AP 14 and a plurality of client stations (STA1 and STA2) that includes downlink OFDMA transmission 1704 of data from the AP to the plurality client stations, according to an embodiment. In an embodiment, the AP 14 obtains a TXOP 1702 and simultaneously transmits a first downlink A-MPDU 1703-1 to the client station STA1 and transmits a second downlink A-MPDU 1703-2 to the client station STA2 using different sub-channels (i.e., tone blocks) of an OFDMA communication channel. In some embodiments, an acknowledgment policy indicates whether an acknowledgment to an uplink OFDM data unit is required or optional and whether the acknowledgment should be sent in response to the receipt of the OFDM data unit or delayed. In an embodiment, the AP 14 determines an order in which acknowledgments are to be transmitted in response to receipt of the uplink OFDM data units from the client stations. In the embodiment shown in FIG. 17, the first downlink A-MPDU 1703-1 corresponds to an indication of an Implicit Block Acknowledgment and the second downlink A-MPDU 1703-2 corresponds to an indication of a Block Acknowledgment.

Based on the indication of the Implicit Block Acknowledgment, the client station STA1 transmits a block acknowledgment 1708 to the AP 14 in response to and upon receipt of the second downlink A-MPDU 1703-2. In an embodiment, the client station STA1 automatically transmits the block acknowledgment 1708 after a short interframe space (SIFS) period from the receipt of the second downlink A-MPDU 1703-2. The client station STA2, based on the indication of the Block Acknowledgment, waits for receipt of a block acknowledgment request (BAR) 1710 from the AP 14 before sending a block acknowledgment 1712 to the AP 14, in an embodiment. The BAR 1710, in some embodiments, is transmitted using a same bandwidth as the original OFDMA transmission 1704. For example, in an embodiment, the OFDMA transmission 1704 occupies a bandwidth of 40 MHz (e.g., 2×20 MHz sub-channels) and the BAR 1710 is duplicated across a same bandwidth. In various embodiments, the client stations STA1 and STA2 transmit the block acknowledgments 1708 and 1712 to occupy a same sub-channel allocated for the corresponding A-MPDU. In an embodiment, the client station transmits the block acknowledgment using a transmission bandwidth equal to the smaller of i) the OFDMA aggregated bandwidth and ii) a smallest bandwidth that the client station is capable of transmitting. In another embodiment, the client station transmits the block acknowledgment using a transmission bandwidth equal to n*20 MHz, where n is a smallest integer value such that the block acknowledgment occupies the same bandwidth as the downlink A-MPDU.

In some embodiments, the BAR 1710 and acknowledgment frames 1708 and 1712 are duplicated in each smallest bandwidth portion (e.g., in each 20 MHz) of the entire bandwidth of the TXOP 1702. For example, in an embodiment, the AP transmits a legacy OFDM data unit as the BAR 1710 and the client stations transmit legacy OFDM data units as the acknowledgment frames 1708 and 1712. In some embodiments, the AP 14 allocates different sub-channels to different client stations within a same TXOP.

Figure 18:
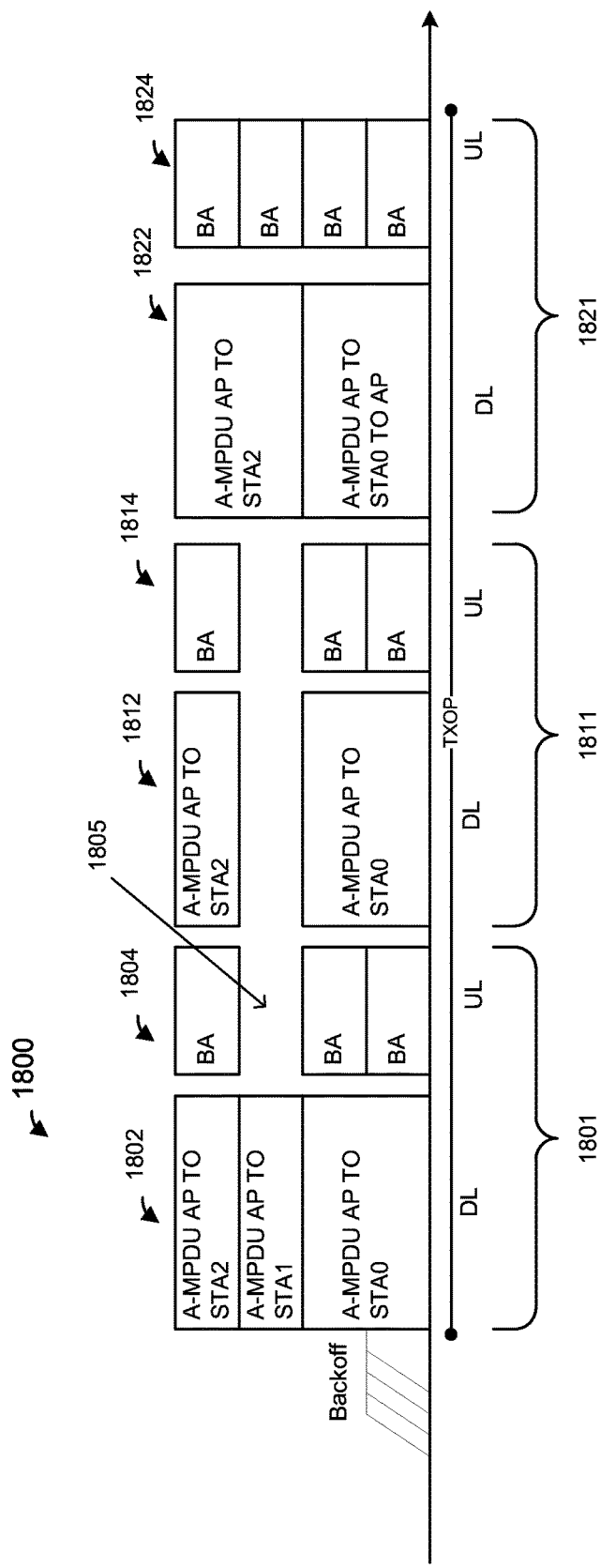
FIG. 18 is a frame exchange between an AP and a plurality of client stations that includes downlink OFDMA transmission of data from the AP to the plurality client stations, according to an embodiment.

FIG. 18 is a frame exchange 1800 between an AP 14 and a plurality of client stations STA0, STA1, STA2 that includes downlink OFDMA transmission of data from the AP to the plurality client stations, according to an embodiment. The frame exchange 1800 includes frame exchanges 1801, 1811, and 1821 that occur during a TXOP of the AP 14. During the frame exchange 1801, the AP 14 transmits a downlink OFDMA data unit 1802 (e.g., including A-MPDUs) to the plurality of client stations STA2, STA1, and STA0. In an embodiment, the downlink OFDMA data unit 1802 is generally similar to the OFDMA data unit 602. In the embodiment illustrated in FIG. 18, the AP 14 receives a block acknowledge 1804 (e.g., an uplink OFDMA data unit) that does not include a block acknowledge from the client station STA1 on a sub-channel 1805. In some embodiments, the AP 14 allocates sub-channels based on the response (e.g., block acknowledgments) to a previously transmitted downlink OFDM data unit. In an embodiment, the AP 14 determines that the sub-channel 1805 is busy or unavailable to the client station STA1 based on the omitted block acknowledgment. In an embodiment, when the AP does not receive an uplink OFDM data unit in response to the downlink OFDMA data unit, the AP does not send downlink OFDM data units for the remainder of the TXOP to those client stations that did not respond.

In an embodiment, the AP 14 transmits a downlink OFDMA data unit having a non-contiguous sub-channel allocation. In an embodiment, for example, based on the determination that an acknowledgment to the previous OFDM data unit was not received, the AP 14 transmits a downlink OFDMA data unit 1812 that omits an OFDM data unit on the sub-channel 1805 during the frame exchange 1811. In an embodiment, the AP 14 allocates the sub-channel 1805 to another client station during the frame exchange 1821. In the embodiment shown in FIG. 18, the AP 14 allocates the sub-channel 1805 to the client station STA2 during the frame exchange 1821.

Figure 19:
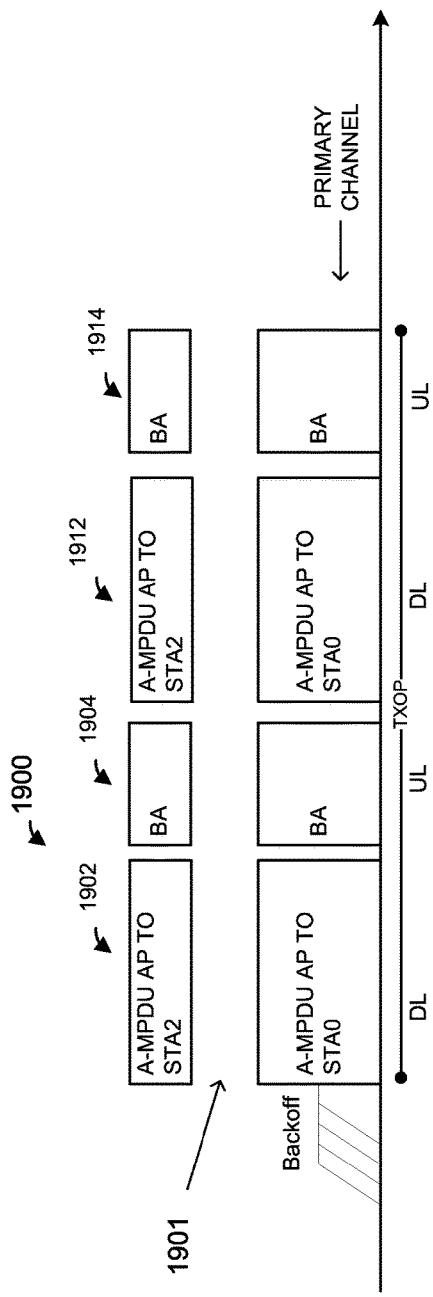
FIG. 19 is a frame exchange between an AP and a plurality of client stations that includes downlink OFDMA transmission of data from the AP to the plurality client stations, according to an embodiment.

FIG. 19 is a frame exchange 1900 between an AP and a plurality of client stations STA0 and STA2 that includes downlink OFDMA transmission of data from the AP to the plurality client stations STA0 and STA2, according to an embodiment. In some embodiments, the AP 14 determines whether sub-channels allocated for a downlink OFDMA transmission are busy prior to the transmission. The frame exchange 1900 is generally similar to the frame exchange 1800, except that the AP 14 determines that a sub-channel 1901 is busy, for example, as described above with respect to FIG. 14. The AP 14 transmits a downlink OFDMA data unit 1902 that omits an OFDM data unit on the sub-channel 1901 during the frame exchange 1900. In some embodiments, the AP 14 does not send downlink OFDM data units on the sub-channel 1901 (e.g., the busy sub-channels) for the remainder of the TXOP.

While an 80 MHz communication channel is allocated to the client stations in the illustrated embodiment of FIG. 19, the AP 14 selects other sub-channel allocations (e.g., 60 MHz, 100 MHz, 120 MHz, 140 MHz, etc.) in other embodiments and/or scenarios. In an embodiment, the AP 14 selects contiguous blocks of 40 MHz, 80 MHz, or 160 MHz for an uplink MU-MIMO transmission. In some embodiments, a physical layer clear channel assessment (PHY-CCA) provides an idle/busy indication for each 20 MHz sub-channel of a communication channel. In an embodiment, the PHY-CCA is redefined to provide at least some sub-channel allocations.

Figure 20:
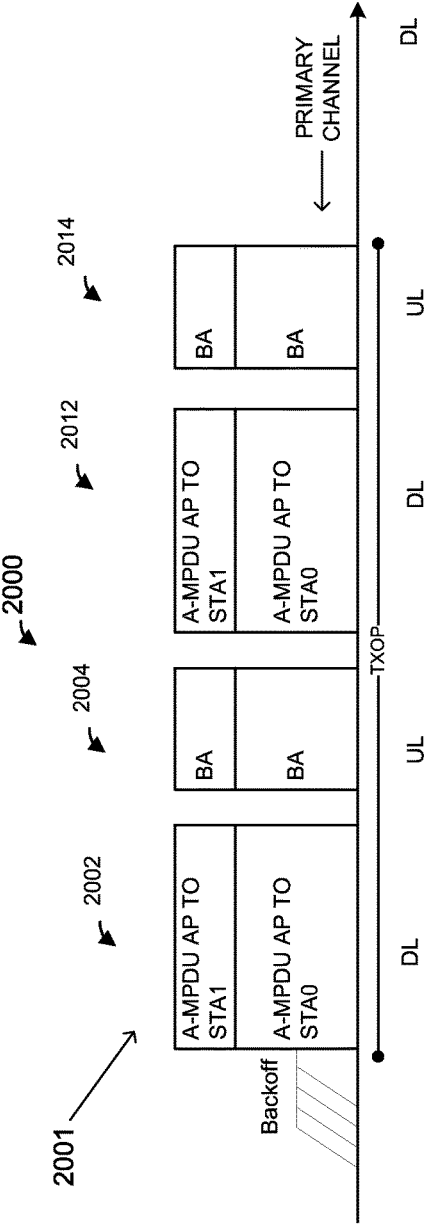
FIG. 20 is a frame exchange between an AP and a plurality of client stations that includes downlink OFDMA transmission of data from the AP to the plurality client stations, according to an embodiment.

FIG. 20 is a frame exchange 2000 between an AP 14 and a plurality of client stations STA0 and STA1 that includes downlink OFDMA transmission of data from the AP to the plurality client stations STA0 and STA1, according to an embodiment. The frame exchange 2000 is generally similar to the frame exchange 1900, except that the AP 14 determines that a sub-channel 2001 is busy, for example, as described above with respect to FIG. 14. The AP 14 transmits a downlink OFDMA data unit 2002 that omits an OFDM data unit on the highest sub-channel 2001 during the frame exchange 1900. In some embodiments, the AP 14 does not send downlink OFDM data units on the sub-channel 2001 (e.g., the busy sub-channels) for the remainder of the TXOP. In the embodiment shown in FIG. 20, the highest 20 MHz sub-channel of the 80 MHz channel is determined to be busy, the second highest 20 MHz sub-channel is allocated to the client station STA1, and a 40 MHz sub-channel that includes the second lowest 20 MHz sub-channel and the lowest 20 MHz sub-channel is allocated to STA0.

Figure 21:
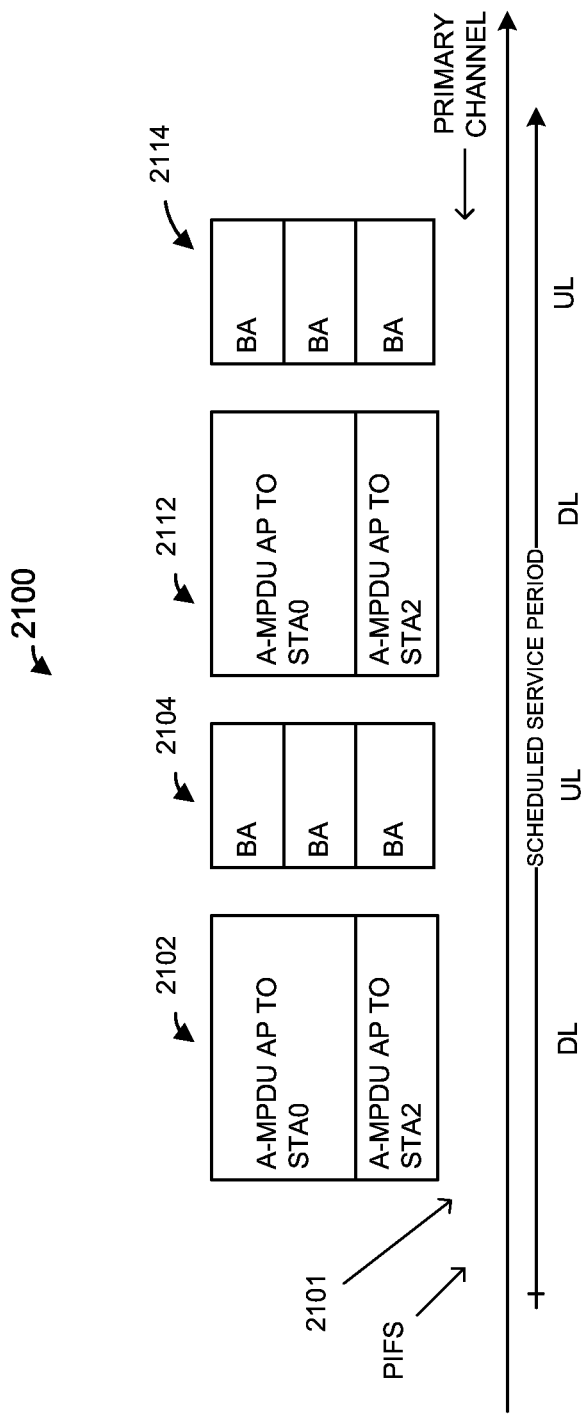
FIG. 21 is a frame exchange between an AP and a plurality of client stations that includes downlink OFDMA transmission of data from the AP to the plurality client stations, according to an embodiment.

FIG. 21 is a frame exchange 2100 between an AP 14 and a plurality of client stations STA0 and STA2 that includes downlink OFDMA transmission of data from the AP 14 to the plurality client stations STA0 and STA2, according to an embodiment. The frame exchange 2100 is generally similar to the frame exchange 2000, except that the AP 14 determines that a primary sub-channel 2101 of a communication channel is busy during a scheduled service period, for example, as described above with respect to FIG. 14. In an embodiment, the AP 14 determines an availability of the sub-channel 2101 of the communication channel during the scheduled service period based on an idle state during a point coordination function interframe space (PIFS).

Figure 22:
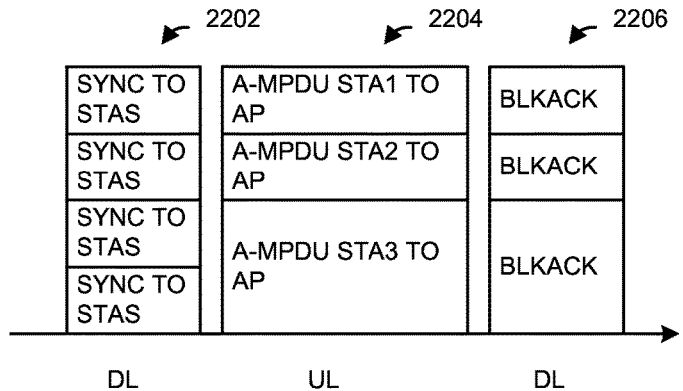
FIG. 22 is a frame exchange between an AP and a plurality of client stations that includes uplink OFDMA transmission of data with selected traffic identifiers, according to an embodiment.

FIG. 22 is a frame exchange 2200 between an AP 14 and a plurality of client stations STA1, STA2, and STA3 that includes uplink OFDMA transmission of data with selected traffic identifiers, according to an embodiment. The frame exchange 2200 is generally similar to the frame exchange 900, except that the AP 14 selects a traffic class (TC) and/or an access category (AC) for A-MPDUs, in an embodiment. The frame exchange 2200 includes a scheduling frame 2202, an uplink OFDMA data unit 2204, and a block acknowledgment 2206. In various embodiments and/or scenarios, different stations transmit uplink OFDM data units having different traffic classes and/or access categories within a same uplink transmission. In an embodiment, the AP 14 selects data frames with a same access category to be encapsulated within an A-MPDU.

In some embodiments, the AP 14 selects a primary access category or traffic class (e.g., a primary AC/TC) for each client station and provides an indication of the selected AC/TC within the scheduling frame 2202. In an embodiment, the indication of the selected AC/TC is included in a PHY SIG field or a control frame. In an embodiment, for example, the scheduling frame 2202 includes i) an identifier for each of the client stations STA1, STA2, and STA3, ii) an indication of sub-channels on which each client station should transmit for the OFDMA data unit 2204, and iii) an indication of a traffic identifier that corresponds to the primary AC/TC. In some embodiments, each client station has a different traffic identifier, for example, the AP 14 selects traffic identifiers TID1, TID3, and TID5 for the client stations STA1, STA2, and STA3, respectively. In an embodiment, this TC allocation is used in an uplink OFDMA exchange in a scheduled service period (TWT service period) and EDCA TXOP. In some embodiments, all client stations have a same traffic identifier, for example, the AP 14 selects traffic identifiers TID1 for the client stations STA1, STA2, and STA3. In one embodiment, this TC allocation is used in an uplink OFDMA exchange in an EDCA TXOP.

In an embodiment, the client station selects frames having the primary AC/TC for transmission in the uplink OFDMA data unit 2204. In an embodiment, the client station selects frames from an AC/TC different from the primary AC/TC if no frames from the primary AC/TC are available (e.g., buffered for transmission). In other embodiments, the scheduling frame 2202 does not include a primary AC/TC and the client station selects the AC/TC for its own uplink OFDM data unit of the OFDMA transmission 2204.

Figure 23:
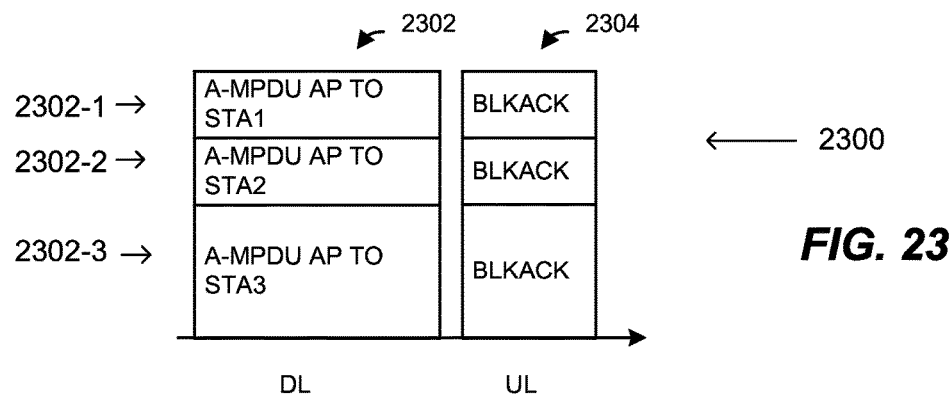
FIG. 23 is a frame exchange between an AP and a plurality of client stations that includes downlink OFDMA transmission of data with selected traffic identifiers, according to an embodiment.

FIG. 23 is a frame exchange 2300 between an AP 14 and a plurality of client stations STA1, STA2, and STA3 that includes downlink OFDMA transmission of data with selected traffic identifiers, according to an embodiment. The frame exchange 2300 is generally similar to the frame exchange 1700, except that the AP 14 selects a traffic class and/or an access category for A-MPDUs, in an embodiment. In an embodiment, the AP 14 selects traffic identifiers TID0, TID7, and TID5 for the client stations STA1, STA2, and STA3, respectively, and generates OFDM data units 2302-1, 2302-2, and 2302-3 having frames with the corresponding traffic identifier. In an embodiment, this TC allocation is used in a downlink OFDMA exchange in a scheduled service period (TWT service period) and an EDCA TXOP. In some embodiments, all client stations have a same traffic identifier, for example, the AP 14 selects the traffic identifier TID1 for the client stations STA1, STA2, and STA3. In one embodiment, this TC allocation is used in a downlink OFDMA exchange in an EDCA TXOP.

Figure 24:
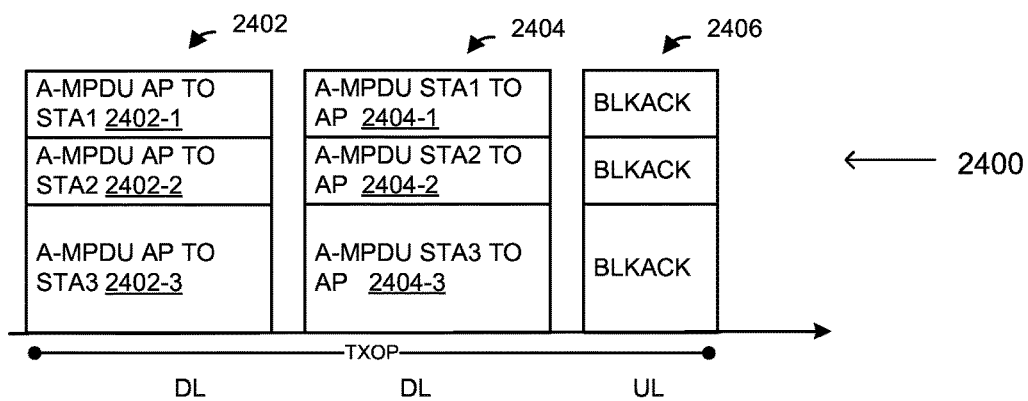
FIG. 24 is a frame exchange between an AP and a plurality of client stations that includes both uplink OFDMA transmission of data and downlink OFDMA transmission of data with selected traffic identifiers, according to an embodiment.

FIG. 24 is a frame exchange 2400 between an AP 14 and a plurality of client stations STA1, STA2, and STA3 that includes both uplink OFDMA transmission of data and downlink OFDMA transmission of data with selected traffic identifiers, according to an embodiment. In some embodiments, the AP 14 provides an indication of different traffic classes for both downlink OFDMA data units and uplink OFDMA data units within a same TXOP. In the embodiment shown in FIG. 24, the frame exchange 2400 includes a downlink OFDMA data unit 2402, an uplink OFDMA data unit 2404, and a block acknowledgment 2406. In an embodiment, the AP 14 generates the OFDMA data unit 2402 to include i) an A-MPDU having a primary AC/TC for each client station, as described above with respect to FIG. 23, and ii) an indication of a primary AC/TC for a subsequent OFDMA transmission by each client station. In an embodiment, each client station generates an OFDM data unit of the uplink OFDMA data unit 2404 to include MPDUs having the primary AC/TC indicated by the OFDMA data unit 2402. In an embodiment, the AP 14 selects a first primary AC/TC for the downlink OFDMA data unit 2402 and a second primary AC/TC for the uplink OFDMA data unit 2404 where the first primary AC/TC is different from the second primary AC/TC.

Figure 25:
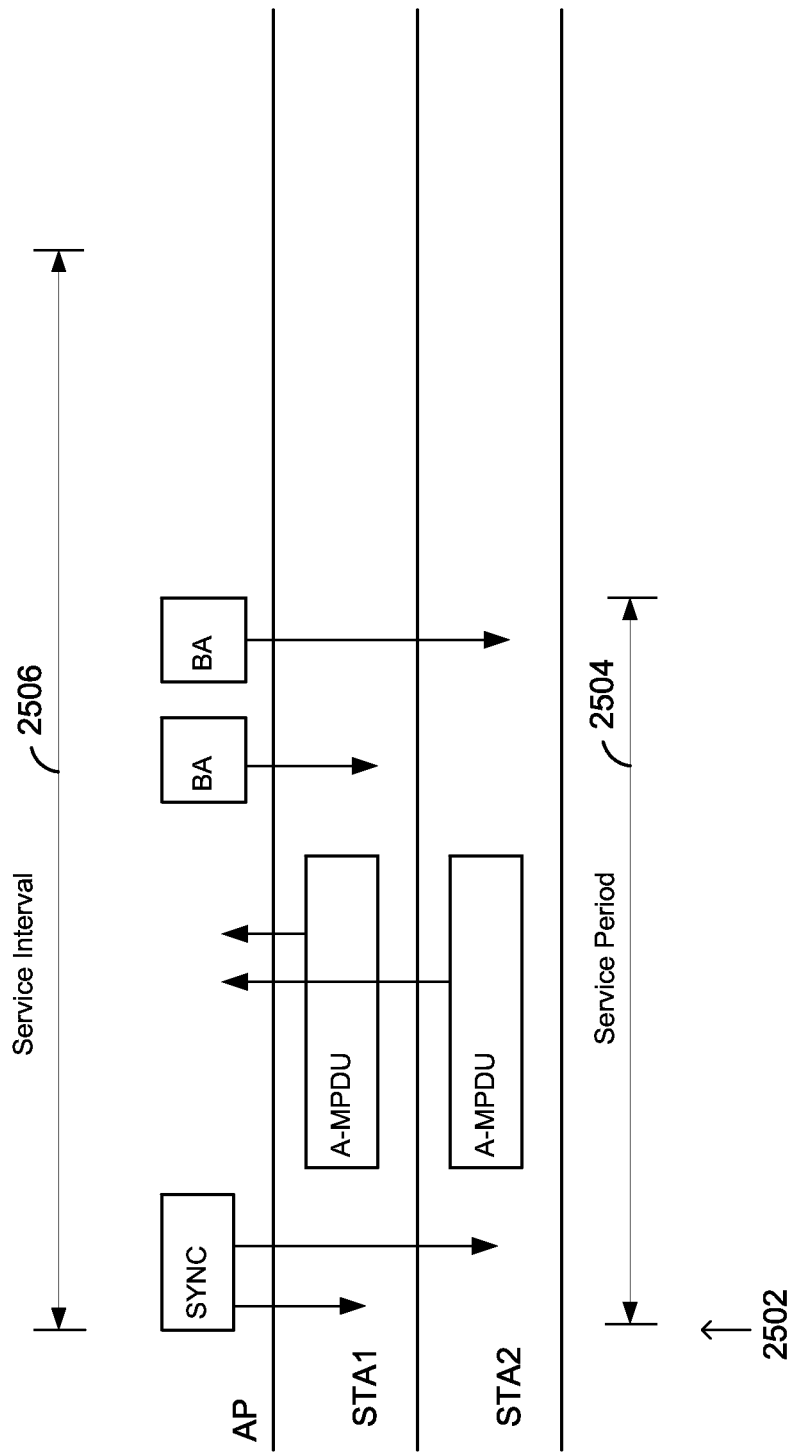
FIG. 25 is a diagram illustrating example uplink OFDMA parameters for an OFDMA group of client stations, and communications between an AP and client stations of the OFDMA group that occur during time periods defined by the OFDMA parameters, according to an embodiment.

FIG. 25 is a diagram illustrating example uplink OFDMA parameters 2500 for an OFDMA group of client stations, and communications between an AP and client stations of the OFDMA group that occur during time periods defined by the OFDMA parameters, according to an embodiment. The example uplink OFDMA parameters 1500 in FIG. 25 include a start time parameter 1502 that indicates a start of communications between the AP 14 and the client stations 25 of the OFDMA group, a service period 2504 that defines a time duration of communications between the AP 14 and the client stations 25 of the OFDMA group, and a scheduling interval 2506 that defines an interval between two consecutive service periods for communications between the AP 14 and the client stations 25 of the OFDMA group. In the embodiment of FIG. 25, the service period 2504 includes a frame exchange between the AP 14 and the client stations 25 in the OFDMA group, in which an uplink OFDMA data unit is transmitted from the client stations 25 in the OFDMA group to the AP 14. For example, the service period 2504 includes the frame exchange 900 of FIG. 9 or another suitable frame exchange as described herein, in an embodiment. In various embodiments and/or scenarios, at the beginning of a scheduled service period, the AP starts a downlink OFDMA frame exchange or uplink frame exchange if the AP 14 determines that the medium is idle for PIFS or after a backoff procedure specific to the scheduled service period.

Figure 26:
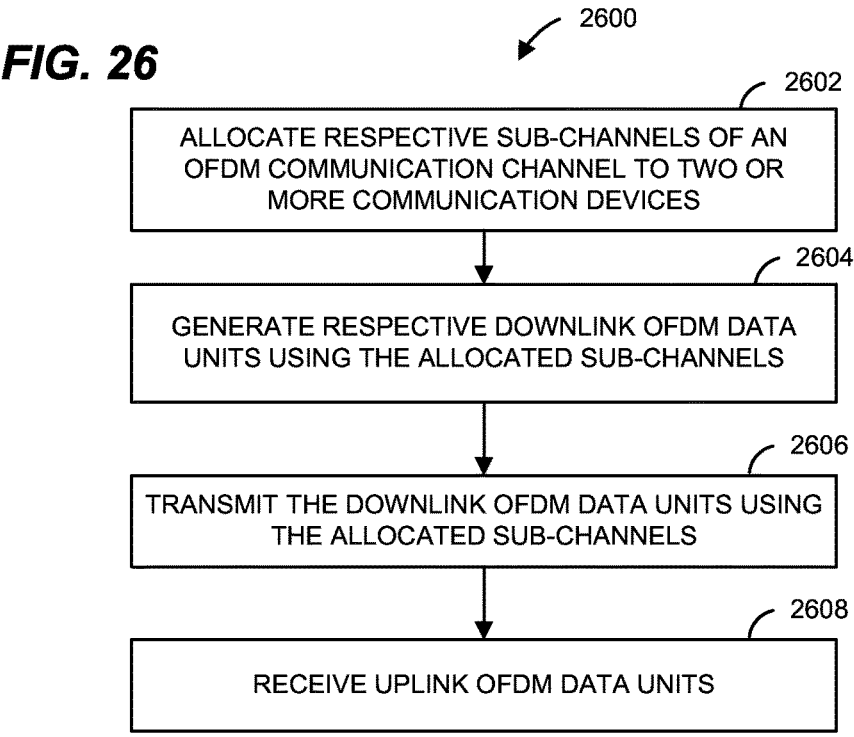
FIG. 26 is a flow diagram of an example method that is implemented by an AP in a WLAN, according to an embodiment.

FIG. 26 is a flow diagram 2600 of an example method for simultaneous communication with multiple communication devices in a wireless local area network, according to an embodiment. In an embodiment, the method 2600 is implemented by an AP in the WLAN, according to an embodiment. With reference to FIG. 1, the method 2600 is implemented by the network interface 16 of the AP 14. For example, the method 2600 is implemented by the MAC processing unit 18 and/or by the PHY processing unit 20 of the network interface 16, in an embodiment. In other embodiments, the method 2600 is implemented by other components of the AP 14, or is implemented by a suitable communication device other than the AP 14.

At block 2602, respective sub-channels of an orthogonal frequency division multiplexing (OFDM) communication channel are allocated to two or more second communication devices for simultaneous OFDM transmission to the two or more second communication devices. In an embodiment, a first sub-channel is allocated to a first one of the two or more second communication devices and a second sub-channel is allocated to a second one of the two or more second communication devices.

At block 2604, respective downlink OFDM data units for the two or more second communication devices using the corresponding allocated sub-channels are generated. At block 2606, the downlink OFDM data units are transmitted to the two or more second communication devices using the corresponding allocated sub-channels.

At block 2608, at least a first uplink OFDM data unit is received from the first one of the two or more second communication devices and a second uplink OFDM data unit is received from the second one of the two or more second communication devices. The first uplink OFDM data unit is transmitted from the first one of the two or more second communication devices via the first sub-channel allocated to the first one of the two or more second communication devices in response to the corresponding downlink OFDM data unit. The second uplink OFDM data unit is transmitted from the second one of the two or more second communication devices via the second sub-channel allocated to the second one of the two or more second communication devices in response to the corresponding downlink OFDM data unit.

Figure 27:
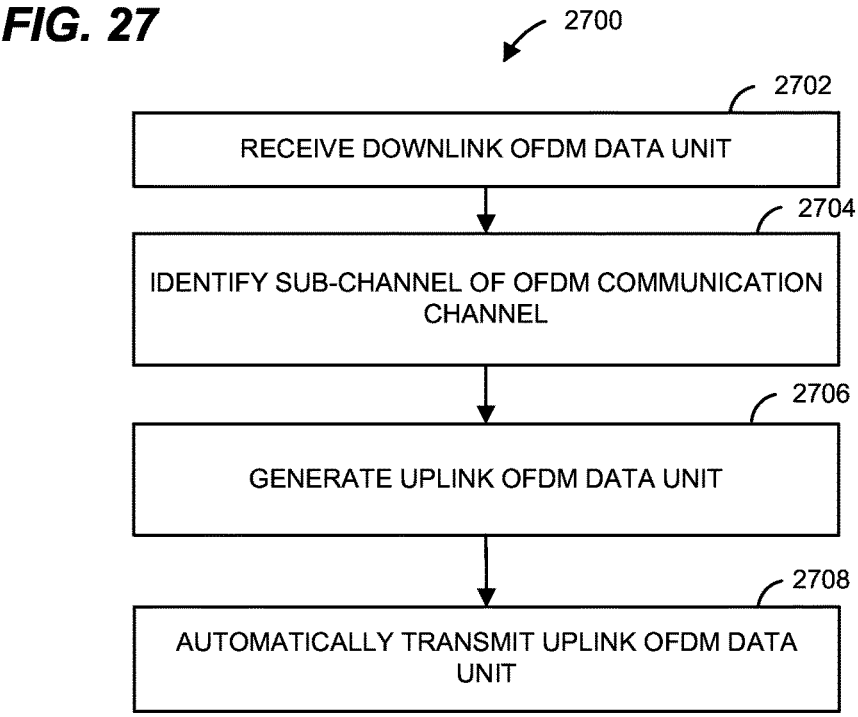
FIG. 27 is a flow diagram of another example method that is implemented by an AP in a WLAN, according to another embodiment.

FIG. 27 is a flow diagram 2700 of an example method for simultaneous communication with multiple communication devices in a wireless local area network, according to an embodiment. In an embodiment, the method 2700 is implemented by a client station in the WLAN, according to an embodiment. With reference to FIG. 1, the method 2700 is implemented by the host processor 26 of the client station 25-1. For example, the method 2700 is implemented by the MAC processing unit 28 and/or by the PHY processing unit 29 of the network interface 27, in an embodiment. In other embodiments, the method 2700 is implemented by other components of the AP 14, or is implemented by a suitable communication device other than the AP 14.

At block 2702, a downlink orthogonal frequency division multiplexing (OFDM) data unit is received by a first communication device from a second communication device via an OFDM communication channel.

At block 2704, a sub-channel of the OFDM communication channel on which the downlink OFDM data unit was transmitted by the second communication device is identified.

At block 2706, an uplink OFDM data unit to be transmitted via the sub-channel on which the downlink OFDM data unit was transmitted is generated by the first communication device in response to the downlink OFDM data unit.

At block 2708, the uplink OFDM data unit is automatically transmitted to the second communication device via the sub-channel on which the downlink OFDM data unit was transmitted.

FIG. 28 is a flow diagram 2800 of an example method for simultaneous communication with multiple communication devices in a wireless local area network, according to an embodiment. In an embodiment, the method 2800 is implemented by a client station in the WLAN, according to an embodiment. With reference to FIG. 1, the method 2800 is implemented by the host processor 26 of the client station 25-1. For example, the method 2800 is implemented by the MAC processing unit 28 and/or by the PHY processing unit 29 of the network interface 27, in an embodiment. In other embodiments, the method 2800 is implemented by other components of the AP 14, or is implemented by a suitable communication device other than the AP 14.

At block 2802, one or more downlink orthogonal frequency division multiplexing (OFDM) data units are received by a first communication device. The downlink OFDM data units are transmitted by a second communication device via one or more respective sub-channels of an OFDM communication channel.

At block 2804, the one or more sub-channels of the OFDM communication channel on which the one or more downlink OFDMA data units were transmitted are identified by the first communication device.

At block 2806, a determination is made whether each of the one or more sub-channels on which the one or more downlink OFDMA data units were transmitted is busy. At block 2808, an uplink OFDM data unit is generated for each sub-channel determined to be not busy. At block 2810, each of the uplink OFDM data units is transmitted to the second communication device via the corresponding sub-channel.

Further aspects of the present invention relate to one or more of the following clauses.

In an embodiment, a method for simultaneous communication with multiple communication devices in a wireless local area network includes: allocating, by a first communication device, respective sub-channels of an orthogonal frequency division multiplexing (OFDM) communication channel to two or more second communication devices for simultaneous OFDM transmission to the two or more second communication devices, including allocating a first sub-channel to a first one of the two or more second communication devices and a second sub-channel to a second one of the two or more second communication devices; generating, by the first communication device, respective downlink OFDM data units for the two or more second communication devices using the corresponding allocated sub-channels; transmitting, by the first communication device, the downlink OFDM data units to the two or more second communication devices using the corresponding allocated sub-channels; and receiving, at the first communication device, at least i) a first uplink OFDM data unit transmitted by the first one of the two or more second communication devices in response to the corresponding downlink OFDM data unit and ii) a second uplink OFDM data unit transmitted by the second one of the two or more second communication devices in response to the corresponding downlink OFDM data unit, wherein the first uplink OFDM data unit is transmitted from the first one of the two or more second communication devices via the first sub-channel allocated to the first one of the two or more second communication devices and the second uplink OFDM data unit is transmitted from the second one of the two or more second communication devices via the second sub-channel allocated to the second one of the two or more second communication devices.

In other embodiments, the method includes any suitable combination of one or more of the following features.

The downlink OFDM data units include synchronization frames and the uplink OFDM data units include aggregate media access control protocol data units (A-MPDUs).

The synchronization frames include respective quality of service indicators, and each of the A-MPDUs includes two or more frames having the corresponding quality of service indicator.

The downlink OFDM data units are A-MPDUs and the uplink OFDM data units are corresponding acknowledgments to the A-MPDUs.

Generating the downlink OFDM data units includes generating a downlink orthogonal frequency division multiple access (OFDMA) data unit that includes the downlink OFDM data units for the two or more second communication devices, and receiving the first uplink OFDM data unit and the second uplink OFDM data unit includes receiving an uplink OFDMA data unit that includes the first uplink OFDM data unit and the second uplink OFDM data unit.

The OFDM communication channel includes a multiple input, multiple output (MIMO) communication channel. Transmitting the downlink OFDM data units to the two or more second communication devices includes transmitting the downlink OFDM data units via the MIMO communication channel, the first sub-channel corresponding to a first space time stream of the MIMO communication channel and the second sub-channel corresponding to a second space time stream of the MIMO communication channel. Receiving the first uplink OFDM data unit and the second uplink OFDM data unit includes receiving the first uplink OFDM data unit via the first space time stream and receiving the second uplink OFDM data unit via the second space time stream. The first uplink OFDM data unit and the second uplink OFDM data unit are transmitted simultaneously from the first one of the two or more second communication devices and the second one of the two or more second communication devices, respectively.

The method further includes: determining an availability of each sub-channel of the OFDM communication channel based on an idle state during a point coordination function interframe space (PIFS), and selecting the sub-channels of the OFDM communication channel for allocation based on the determined idle state.

In another embodiment, a first communication device includes a network interface device configured to: allocate respective sub-channels of an orthogonal frequency division multiplexing (OFDM) communication channel to two or more second communication devices for simultaneous OFDM transmission to the two or more second communication devices, the sub-channels including a first sub-channel allocated to a first one of the two or more second communication devices and a second sub-channel allocated to a second one of the two or more second communication devices, generate respective downlink OFDM data units for the two or more second communication devices using the corresponding allocated sub-channels, transmit the downlink OFDM data units to the two or more second communication devices using the corresponding allocated sub-channels, and receive, in response to the downlink OFDM data units, at least a first uplink OFDM data unit from the first one of the two or more second communication devices and a second uplink OFDM data unit from the second one of the two or more second communication devices, wherein the first uplink OFDM data unit is transmitted from the first one of the two or more second communication devices via the first sub-channel allocated to the first one of the two or more second communication devices and the second uplink OFDM data unit is transmitted from the second one of the two or more second communication devices via the second sub-channel allocated to the second one of the two or more second communication devices.

The downlink OFDM data units include synchronization frames and the uplink OFDM data units include aggregate media access control protocol data units (A-MPDUs).

The synchronization frames include respective quality of service indicators, and each of the A-MPDUs includes two or more frames having the corresponding quality of service indicator.

The downlink OFDM data units are A-MPDUs and the uplink OFDM data units are corresponding acknowledgments to the A-MPDUs.

The network interface is configured to: generate a downlink orthogonal frequency division multiple access (OFDMA) data unit that includes the downlink OFDM data units for the two or more second communication devices, and receive an uplink OFDMA data unit that includes the first uplink OFDM data unit and the second uplink OFDM data unit.

The OFDM communication channel includes a multiple input, multiple output (MIMO) communication channel, and the network interface is configured to transmit the downlink OFDM data units via the MIMO communication channel, the first sub-channel corresponding to a first space time stream of the MIMO communication channel and the second sub-channel corresponding to a second space time stream of the MIMO communication channel, and receive the first uplink OFDM data unit via the first space time stream and the second uplink OFDM data unit via the second space time stream, and the first uplink OFDM data unit and the second uplink OFDM data unit are transmitted simultaneously from the first one of the two or more second communication devices and the second one of the two or more second communication devices, respectively.

In an embodiment, a method for simultaneous communication with multiple communication devices in a wireless local area network includes: receiving, at a first communication device from a second communication device, a downlink orthogonal frequency division multiplexing (OFDM) data unit via an OFDM communication channel, identifying, by the first communication device, a sub-channel of the OFDM communication channel on which the downlink OFDM data unit was transmitted by the second communication device, generating, by the first communication device in response to the downlink OFDM data unit, an uplink OFDM data unit to be transmitted via the sub-channel on which the downlink OFDM data unit was transmitted, automatically transmitting the uplink OFDM data unit to the second communication device via the sub-channel on which the downlink OFDM data unit was transmitted.

Automatically transmitting the uplink OFDM data unit includes transmitting the uplink OFDM data unit after a short interframe space (SIFS) time interval from receipt of the downlink OFDM data unit without determining whether the sub-channel is busy between the receipt of the downlink OFDM data unit and the transmission of the uplink OFDM data unit.

The downlink OFDM data unit includes a synchronization frame and the uplink OFDM data unit includes an aggregate media access control protocol data unit (A-MPDU).

The method further includes: receiving, at the first communication device via the sub-channel on which the downlink OFDM data unit was transmitted, a block acknowledgment that indicates receipt of the A-MPDU by the second communication device.

The method further includes receiving, at the first communication device, a broadcast block acknowledgment having i) a first device identifier corresponding to the first communication device, ii) one or more other device identifiers corresponding to one or more other communication devices, iii) a first bitmap that indicates whether each MPDU in the A-MPDU was successfully received by the second communication device, and iv) one or more other bitmaps corresponding to the one or more other communication devices.

The synchronization frame includes a quality of service indicator, and generating the uplink OFDM data unit includes generating the A-MPDU to include two or more MPDUs having the corresponding quality of service indicator.

The downlink OFDM data unit includes an A-MPDU and the uplink OFDM data unit includes an acknowledgment to the A-MPDU.

The uplink OFDM data unit is a portion of an orthogonal frequency division multiple access (OFDMA) data unit.

The OFDM communication channel includes a MIMO communication channel and the sub-channel includes a space time stream of the MIMO communication channel. Receiving the downlink OFDM data unit includes receiving the downlink OFDM data unit via the space time stream.

In another embodiment, a first communication device includes a network interface device configured to: receive, from a second communication device, a downlink orthogonal frequency division multiplexing (OFDM) data unit via an OFDM communication channel, identify a sub-channel of the OFDM communication channel on which the downlink OFDM data unit was transmitted by the second communication device, generate, in response to the downlink OFDM data unit, an uplink OFDM data unit to be transmitted via the sub-channel on which the downlink OFDM data unit was transmitted, and automatically transmit the uplink OFDM data unit to the second communication device via the sub-channel on which the downlink OFDM data unit was transmitted.

The network interface is configured to automatically transmit the uplink OFDM data unit a short interframe space (SIFS) time interval after receipt of the downlink OFDM data unit without determining whether the sub-channel is busy between the receipt of the downlink OFDM data unit and the transmission of the uplink OFDM data unit.

The downlink OFDM data unit includes a synchronization frame and the uplink OFDM data unit includes an aggregate media access control protocol data unit (A-MPDU).

The network interface is configured to receive, via the sub-channel on which the downlink OFDM data unit was transmitted, a block acknowledgment that indicates receipt of the A-MPDU by the second communication device.

The network interface is configured to receive a broadcast block acknowledgment having i) a first device identifier corresponding to the first communication device, ii) one or more other device identifiers corresponding to one or more other communication devices, iii) a first bitmap that indicates whether each MPDU in the A-MPDU was successfully received by the second communication device, and iv) one or more other bitmaps corresponding to the one or more other communication devices.

The synchronization frame includes a quality of service indicator, and the network interface is configured to generate the A-MPDU to include two or more MPDUs having the corresponding quality of service indicator.

The downlink OFDM data unit includes an A-MPDU and the uplink OFDM data unit includes an acknowledgment to the A-MPDU.

The uplink OFDM data unit is a portion of an orthogonal frequency division multiple access (OFDMA) data unit, and wherein the OFDMA data unit further includes another OFDM data unit simultaneously transmitted by a third communication device with the uplink OFDM data unit.

The OFDM communication channel includes a MIMO communication channel and the sub-channel includes a space time stream of the MIMO communication channel. The network interface is configured to receive the downlink OFDM data unit via the space time stream.

In an embodiment, a method for simultaneous communication with multiple communication devices in a wireless local area network includes: receiving, at a first communication device, one or more downlink orthogonal frequency division multiplexing (OFDM) data units transmitted by a second communication device via one or more respective sub-channels of an OFDM communication channel; identifying, by the first communication device, the one or more sub-channels of the OFDM communication channel on which the one or more downlink OFDMA data units were transmitted; determining, by the first communication device, whether each of the one or more sub-channels on which the one or more downlink OFDMA data units were transmitted is busy; generating, by the first communication device, an uplink OFDM data unit for each sub-channel determined to be not busy; and transmitting each of the uplink OFDM data units to the second communication device via the corresponding sub-channel.

The one or more downlink OFDM data units include synchronization frames and the one or more uplink OFDM data units include one or more aggregate media access control protocol data units (A-MPDU).

The method further includes: receiving, at the first communication device via the sub-channels on which the one or more uplink OFDM data units were transmitted, a block acknowledgment that indicates receipt of the one or more A-MPDUs by the second communication device.

The method further includes: receiving, at the first communication device, a broadcast block acknowledgment having i) a first device identifier corresponding to the first communication device, ii) one or more other device identifiers corresponding to one or more other communication devices, iii) one or more bitmaps that indicate whether each of the one or more A-MPDUs was successfully received by the second communication device, and iv) one or more other bitmaps corresponding to the one or more other communication devices.

The synchronization frame includes a quality of service indicator, and generating the one or more uplink OFDM data units includes generating the one or more A-MPDU to include only MPDUs having the corresponding quality of service indicator.

The one or more downlink OFDM data units include one or more A-MPDUs and the one or more uplink OFDM data units include one or more acknowledgments to the one or more A-MPDU.

The one or more uplink OFDM data units are a portion of an orthogonal frequency division multiple access (OFDMA) data unit.

The OFDM communication channel includes a MIMO communication channel and the one or more sub-channels include one or more space time streams of the MIMO communication channel. Receiving the one or more downlink OFDM data units includes receiving the one or more downlink OFDM data unit via the corresponding space time stream.

In another embodiment, a first communication device includes a network interface device configured to: receive, from a second communication device, one or more downlink orthogonal frequency division multiplexing (OFDM) data units transmitted by a second communication device via one or more respective sub-channels of an OFDM communication channel, identify, by the first communication device, the one or more sub-channels of the OFDM communication channel on which the one or more downlink OFDMA data units were transmitted, determine, by the first communication device, whether each of the one or more sub-channels on which the one or more downlink OFDMA data units were transmitted is busy; generate, by the first communication device, an uplink OFDM data unit for each sub-channel determined to be not busy, and transmit each of the uplink OFDM data units to the second communication device via the corresponding sub-channel.

The one or more downlink OFDM data units include one or more synchronization frames and the one or more uplink OFDM data units include one or more aggregate media access control protocol data units (A-MPDU).

The network interface is configured to receive, via the sub-channels on which the one or more uplink OFDM data units were transmitted, a block acknowledgment that indicates receipt of the one or more A-MPDUs by the second communication device.

The network interface is configured to receive a broadcast block acknowledgment having i) a first device identifier corresponding to the first communication device, ii) one or more other device identifiers corresponding to one or more other communication devices, iii) one or more bitmaps that indicate whether each of the one or more A-MPDUs was successfully received by the second communication device, and iv) one or more other bitmaps corresponding to the one or more other communication devices.

The synchronization frame includes a quality of service indicator, and the network interface is configured to generate the one or more uplink OFDM data units includes generating the one or more A-MPDU to include only MPDUs having the corresponding quality of service indicator.

The one or more downlink OFDM data units include one or more A-MPDUs and the one or more uplink OFDM data units include one or more acknowledgments to the one or more A-MPDU.

The one or more uplink OFDM data units are a portion of an orthogonal frequency division multiple access (OFDMA) data unit.

The OFDM communication channel includes a MIMO communication channel and the one or more sub-channels include one or more space time streams of the MIMO communication channel. The network interface is configured to receive the one or more downlink OFDM data unit via the corresponding space time stream.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any tangible, non-transitory computer readable memory such as a magnetic disk, an optical disk, a RAM, a ROM, a flash memory, a tape drive, etc. The software or firmware instructions may include machine readable instructions that, when executed by one or more processors, cause one or more processors to perform various acts.

When implemented in hardware, the hardware may comprise one or more of discrete components, one or more integrated circuits, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for simultaneous communication with multiple communication devices in a wireless local area network, the method comprising:
   allocating, by a first communication device, respective sub-channels of an orthogonal frequency division multiplexing (OFDM) communication channel to two or more second communication devices for simultaneous OFDM transmission to the two or more second communication devices, including allocating a first sub-channel to a first one of the two or more second communication devices and a second sub-channel to a second one of the two or more second communication devices;
   generating, by the first communication device, respective downlink OFDM data units for the two or more second communication devices using the corresponding allocated sub-channels wherein the downlink OFDM data units comprise synchronization frames that include respective quality of service indicators, including at least first and second quality of service indicators that are different from each other and correspond to the first and second ones of the two or more second communication devices, respectively;
   transmitting, by the first communication device, the downlink OFDM data units to the two or more second communication devices using the corresponding allocated sub-channels; and
   receiving, at the first communication device, at least i) a first uplink OFDM data unit that comprises a first aggregate media access control protocol data unit (A-MPDU) transmitted by the first one of the two or more second communication devices in response to the corresponding downlink OFDM data unit and ii) a second uplink OFDM data unit that comprises a second A-MPDU transmitted by the second one of the two or more second communication devices in response to the corresponding downlink OFDM data unit, wherein the first uplink OFDM data unit is transmitted from the first one of the two or more second communication devices via the first sub-channel allocated to the first one of the two or more second communication devices and the second uplink OFDM data unit is transmitted from the second one of the two or more second communication devices via the second sub-channel allocated to the second one of the two or more second communication devices;

wherein each of the first A-MPDU and the second A-MPDU comprises two or more MPDUs having the corresponding quality of service indicator.

2. The method of claim 1, wherein:
transmitting the downlink OFDM data units comprises performing a medium access procedure; and
the downlink OFDM data units and the uplink OFDM data units comprise respective quality of service indicators selected based on the medium access procedure.

3. The method of claim 1, wherein each of the A-MPDUs is an acknowledgement of the corresponding synchronization frame and receipt of at least one of the A-MPDUs indicates a successful frame exchange.

4. The method of claim 1, wherein the downlink OFDM data units are A-MPDUs and the uplink OFDM data units are corresponding acknowledgments to the A-MPDUs.

5. The method of claim 1, wherein:
generating the downlink OFDM data units comprises generating a downlink orthogonal frequency division multiple access (OFDMA) data unit that includes the downlink OFDM data units for the two or more second communication devices; and
receiving the first uplink OFDM data unit and the second uplink OFDM data unit comprises receiving an uplink OFDMA data unit that includes the first uplink OFDM data unit and the second uplink OFDM data unit.

6. The method of claim 5, wherein:
a total bandwidth of the uplink OFDMA data unit corresponds to a total bandwidth of the downlink OFDMA data unit;
each sub-channel of the uplink OFDMA data unit corresponds to a sub-channel of the downlink OFDMA data unit; and
each smallest bandwidth sub-channel of the OFDM communication channel occupied by the downlink OFDMA data unit is occupied by at least one sub-channel of the uplink OFDMA data unit.

7. The method of claim 1, wherein:
the OFDM communication channel comprises a multiple input, multiple output (MIMO) communication channel;
transmitting the downlink OFDM data units to the two or more second communication devices comprises transmitting the downlink OFDM data units via the MIMO communication channel, the first sub-channel corresponding to a first space time stream of the MIMO communication channel and the second sub-channel corresponding to a second space time stream of the MIMO communication channel;
receiving the first uplink OFDM data unit and the second uplink OFDM data unit comprises receiving the first uplink OFDM data unit via the first space time stream and receiving the second uplink OFDM data unit via the second space time stream; and
the first uplink OFDM data unit and the second uplink OFDM data unit are transmitted simultaneously from the first one of the two or more second communication devices and the second one of the two or more second communication devices, respectively.

8. The method of claim 1, further comprising:
determining an availability of each sub-channel of the OFDM communication channel based on an idle state during a point coordination function interframe space (PIFS); and
selecting the sub-channels of the OFDM communication channel for allocation based on the determined idle state.

9. The method of claim 1, wherein the first A-MPDU further comprises an MPDU corresponding to a quality of service indicator that is different from the first quality of service indicator.

10. A first communication device, comprising:
a network interface including:
one or more integrated circuits,
a media access control (MAC) processing unit implemented on the one or more integrated circuits, and
a physical layer (PHY) processing unit implemented on the one or more integrated circuits and coupled to the MAC processing unit;
wherein the one or more integrated circuits are configured to:
allocate respective sub-channels of an orthogonal frequency division multiplexing (OFDM) communication channel to two or more second communication devices for simultaneous OFDM transmission to the two or more second communication devices, the sub-channels including a first sub-channel allocated to a first one of the two or more second communication devices and a second sub-channel allocated to a second one of the two or more second communication devices,
generate respective downlink OFDM data units for the two or more second communication devices using the corresponding allocated sub-channels, wherein the downlink OFDM data units comprise synchronization frames that include respective quality of service indicators, including at least first and second quality of service indicators that are different from each other and correspond to the first and second ones of the two or more second communication devices, respectively,
transmit the downlink OFDM data units to the two or more second communication devices using the corresponding allocated sub-channels, and
receive, in response to the downlink OFDM data units, at least a first uplink OFDM data unit from the first one of the two or more second communication devices and a second uplink OFDM data unit from the second one of the two or more second communication devices, wherein the first uplink OFDM data unit comprises an aggregate media access control protocol data unit (A-MPDU) that is transmitted from the first one of the two or more second communication devices via the first sub-channel allocated to the first one of the two or more second communication devices and the second uplink OFDM data unit comprises an A-MPDU that is transmitted from the second one of the two or more second communication devices via the second sub-channel allocated to the second one of the two or more second communication devices;
wherein each of the A-MPDUs comprises two or more MPDUs having the corresponding quality of service indicator.

11. The first communication device of claim 10, wherein:
the MAC processing unit is configured to perform a medium access procedure; and
the downlink OFDM data units and the uplink OFDM data units comprise respective quality of service indicators selected based on the medium access procedure.

12. The first communication device of claim 10, wherein each of the A-MPDUs is an acknowledgement of the corresponding synchronization frame and receipt of at least one of the A-MPDUs indicates a successful frame exchange.

13. The first communication device of claim 10, wherein the downlink OFDM data units are A-MPDUs and the uplink OFDM data units are corresponding acknowledgments to the A-MPDUs.

14. The first communication device of claim 10, wherein the one or more integrated circuits are configured to:
generate a downlink orthogonal frequency division multiple access (OFDMA) data unit that includes the downlink OFDM data units for the two or more second communication devices; and
receive an uplink OFDMA data unit that includes the first uplink OFDM data unit and the second uplink OFDM data unit.

15. The first communication device of claim 14, wherein:
a total bandwidth of the uplink OFDMA data unit corresponds to a total bandwidth of the downlink OFDMA data unit;
each sub-channel of the uplink OFDMA data unit corresponds to a sub-channel of the downlink OFDMA data unit; and
each smallest bandwidth sub-channel of the OFDM communication channel occupied by the downlink OFDMA data unit is occupied by at least one sub-channel of the uplink OFDMA data unit.

16. The first communication device of claim 10, wherein:
the OFDM communication channel comprises a multiple input, multiple output (MIMO) communication channel; and
the one or more integrated circuits are configured to:
transmit the downlink OFDM data units via the MIMO communication channel, the first sub-channel corresponding to a first space time stream of the MIMO communication channel and the second sub-channel corresponding to a second space time stream of the MIMO communication channel, and
receive the first uplink OFDM data unit via the first space time stream and the second uplink OFDM data unit via the second space time stream, and
wherein the first uplink OFDM data unit and the second uplink OFDM data unit are transmitted simultaneously from the first one of the two or more second communication devices and the second one of the two or more second communication devices, respectively.

17. The first communication device of claim 10, wherein the first A-MPDU further comprises an MPDU corresponding to a quality of service indicator that is different from the first quality of service indicator.

18. A method for simultaneous communication with multiple communication devices in a wireless local area network, the method comprising:
receiving, at a first communication device from a second communication device, a downlink orthogonal frequency division multiplexing (OFDM) data unit of a multi-user data unit via an OFDM communication channel, wherein the multi-user data unit comprises synchronization frames that include respective quality of service indicators, including at least first and second quality of service indicators that are different from each other and correspond to the first communication device and a third communication device, respectively;
identifying, by the first communication device, a sub-channel of the OFDM communication channel on which the downlink OFDM data unit was transmitted by the second communication device;
generating, by the first communication device in response to the downlink OFDM data unit, an uplink OFDM data unit that comprises an aggregate media access control protocol data unit (A-MPDU) to be transmitted via the sub-channel on which the downlink OFDM data unit was transmitted, wherein the A-MPDU comprises two or more MPDUs having the corresponding quality of service indicator; and
automatically transmitting the uplink OFDM data unit as a portion of an uplink multi-user data unit to the second communication device via the sub-channel on which the downlink OFDM data unit was transmitted.

19. The method of claim 18, wherein automatically transmitting the uplink OFDM data unit comprises transmitting the uplink OFDM data unit after a short interframe space (SIFS) time interval from receipt of the downlink OFDM data unit without determining whether the sub-channel is busy between the receipt of the downlink OFDM data unit and the transmission of the uplink OFDM data unit.

20. The method of claim 18, further comprising receiving, at the first communication device via the sub-channel on which the downlink OFDM data unit was transmitted, a block acknowledgment that indicates receipt of the A-MPDU by the second communication device.

21. The method of claim 18, further comprising receiving, at the first communication device, a broadcast block acknowledgment having i) a first device identifier corresponding to the first communication device, ii) one or more other device identifiers corresponding to one or more other communication devices that include the third communication device, iii) a first bitmap that indicates whether each MPDU in the A-MPDU was successfully received by the second communication device, and iv) one or more other bitmaps corresponding to the one or more other communication devices.

22. The method of claim 18, wherein the downlink OFDM data unit comprises an A-MPDU and the uplink OFDM data unit comprises an acknowledgment to the A-MPDU.

23. The method of claim 18, wherein the uplink multi-user data unit is an orthogonal frequency division multiple access (OFDMA) data unit, and wherein the OFDMA data unit further comprises another OFDM data unit simultaneously transmitted by the third communication device with the uplink OFDM data unit.

24. The method of claim 18, wherein:
the OFDM communication channel comprises a MIMO communication channel and the sub-channel comprises a space time stream of the MIMO communication channel; and
receiving the downlink OFDM data unit comprises receiving the downlink OFDM data unit via the space time stream.

25. The method of claim 18, wherein the A-MPDU further comprises an MPDU corresponding to a quality of service indicator that is different from the first quality of service indicator.

26. A first communication device, comprising:
a network interface including:
one or more integrated circuits,
a media access control (MAC) processing unit implemented on the one or more integrated circuits, and
a physical layer (PHY) processing unit implemented on the one or more integrated circuits and coupled to the MAC processing unit;

wherein the one or more integrated circuits are configured to:

receive, from a second communication device, a downlink orthogonal frequency division multiplexing (OFDM) data unit of a multi-user data unit via an OFDM communication channel, wherein the multi-user data unit comprises synchronization frames that include respective quality of service indicators, including at least first and second quality of service indicators that are different from each other and correspond to the first communication device and a third communication device, respectively, identify a sub-channel of the OFDM communication channel on which the downlink OFDM data unit was transmitted by the second communication device, generate, in response to the downlink OFDM data unit, an uplink OFDM data unit that comprises an aggregate media access control protocol data unit (A-MPDU) to be transmitted via the sub-channel on which the downlink OFDM data unit was transmitted, wherein the A-MPDU comprises two or more MPDUs having the corresponding quality of service indicator, and automatically transmit the uplink OFDM data unit as a portion of an uplink multi-user data unit to the second communication device via the sub-channel on which the downlink OFDM data unit was transmitted.

27. The first communication device of claim 26, wherein the one or more integrated circuits are configured to automatically transmit the uplink OFDM data unit a short interframe space (SIFS) time interval after receipt of the downlink OFDM data unit without determining whether the sub-channel is busy between the receipt of the downlink OFDM data unit and the transmission of the uplink OFDM data unit.

28. The first communication device of claim 26, wherein the one or more integrated circuits are configured to receive, via the sub-channel on which the downlink OFDM data unit was transmitted, a block acknowledgment that indicates receipt of the A-MPDU by the second communication device.

29. The first communication device of claim 27, wherein the one or more integrated circuits are configured to receive a broadcast block acknowledgment having i) a first device identifier corresponding to the first communication device, ii) one or more other device identifiers corresponding to one or more other communication devices that include the third communication device, iii) a first bitmap that indicates whether each MPDU in the A-MPDU was successfully received by the second communication device, and iv) one or more other bitmaps corresponding to the one or more other communication devices.

30. The first communication device of claim 26, wherein the downlink OFDM data unit comprises an A-MPDU and the uplink OFDM data unit comprises an acknowledgment to the A-MPDU.

31. The first communication device of claim 26, wherein the uplink multi-user data unit is an orthogonal frequency division multiple access (OFDMA) data unit, and wherein the OFDMA data unit further comprises another OFDM data unit simultaneously transmitted by the third communication device with the uplink OFDM data unit.

32. The first communication device of claim 26, wherein:
the OFDM communication channel comprises a MIMO communication channel and the sub-channel comprises a space time stream of the MIMO communication channel; and
the one or more integrated circuits are configured to receive the downlink OFDM data unit via the space time stream.

33. The first communication device of claim 26, wherein the A-MPDU further comprises an MPDU corresponding to a quality of service indicator that is different from the first quality of service indicator.

* * * * *